United States Patent [19]
Tamaki et al.

[11] Patent Number: 5,984,532
[45] Date of Patent: Nov. 16, 1999

[54] OPTICAL FIBER CONNECTOR

[75] Inventors: Yasuhiro Tamaki, Yachiyo; Toshiyuki Tanaka, Sakura; Akito Nishimura, Inba-gun; Yuichi Yoshida; Hiroshi Yokosuka, both of Sakura, all of Japan

[73] Assignee: Fujikura Ltd., Tokyo, Japan

[21] Appl. No.: 09/029,315

[22] PCT Filed: Aug. 23, 1996

[86] PCT No.: PCT/JP96/02357

§ 371 Date: Feb. 12, 1998

§ 102(e) Date: Feb. 12, 1998

[87] PCT Pub. No.: WO97/08575

PCT Pub. Date: Mar. 6, 1997

[30] Foreign Application Priority Data

| Aug. 24, 1995 | [JP] | Japan | ................................... | 7-216371 |
| Sep. 21, 1995 | [JP] | Japan | ................................... | 7-243491 |
| Sep. 29, 1995 | [JP] | Japan | ................................... | 7-253994 |
| Nov. 30, 1995 | [JP] | Japan | ................................... | 7-313247 |
| Dec. 14, 1995 | [JP] | Japan | ................................... | 7-326110 |
| Jan. 22, 1996 | [JP] | Japan | ................................... | 8-008765 |
| Jan. 22, 1996 | [JP] | Japan | ................................... | 8-008766 |
| Jan. 22, 1996 | [JP] | Japan | ................................... | 8-008767 |
| Jun. 28, 1996 | [JP] | Japan | ................................... | 8-170456 |

[51] Int. Cl.⁶ .................................................. G02B 6/38
[52] U.S. Cl. ................................ 385/70; 385/83; 385/95; 385/53
[58] Field of Search ................................. 385/70, 71, 73, 385/53, 54, 55, 76, 83, 95–99

[56] References Cited

U.S. PATENT DOCUMENTS

| 4,146,301 | 3/1979 | Cherin et al. ...................... 385/100 X |
| 4,634,216 | 1/1987 | Calevo et al. ........................ 385/84 X |
| 4,787,697 | 11/1988 | Alrutz ........................................ 385/95 |
| 4,973,126 | 11/1990 | Degani et al. ........................ 385/83 X |
| 5,392,373 | 2/1995 | Essert ....................................... 385/92 |
| 5,430,821 | 7/1995 | Sasoka et al. ............................ 385/99 |
| 5,440,657 | 8/1995 | Essert ....................................... 385/71 |
| 5,857,045 | 1/1999 | Lee .......................................... 385/70 |

FOREIGN PATENT DOCUMENTS

| 0 384 678 | 8/1990 | European Pat. Off. . |
| 53-087246 | 8/1978 | Japan . |
| 53-87246 | 8/1978 | Japan . |
| 60-107907 | 6/1985 | Japan . |
| 60-107907 | 7/1985 | Japan . |
| 63-191302 | 12/1988 | Japan . |
| 1-72105 | 3/1989 | Japan . |
| 2-67503 | 3/1990 | Japan . |

*Primary Examiner*—Phan T. H. Palmer
*Attorney, Agent, or Firm*—Sprung Kramer Schaefer & Briscoe

[57] ABSTRACT

An optical fiber connector comprising a base and a lid member constituting an element having a doubly split structure which forms a roughly rod-like shape when united, and a spring for housing the base and lid member and applying pressure for pressing them together, wherein centering grooves for positioning and centering optical fibers for adjoinment and connection are provided in at least one or between the opposing faces of the base and lid member which are put together. In a mode wherein the element is inserted into a C-shaped spring having a rod shape with a C-shaped cross section, the optical fibers which are inserted from both ends of the element are pushed to the centering groove and adjoined into connection. By inserting or withdrawing wedges into wedge insertion grooves formed between the base and the lid member, it is possible to open or close the element.

18 Claims, 18 Drawing Sheets

OPTICAL FIBER CONNECTOR

TECHNICAL FIELD

The present invention relates to an optical fiber connector used in mechanical splices and the like.

BACKGROUND ART

Conventionally, optical fiber connectors have a structure wherein two optical fibers in mutual abutment are affixed inside the same housing.

Structures for positioning and centering inside such optical fiber connectors include (1) structures wherein the optical fibers are adjoined by inserting them into the ends of a microcapillary, (2) structures wherein the optical fibers are adjoined by laying them in positioning grooves and (3) structures wherein the optical fibers are positioned by being supported in the center of three precision rods or three precision balls. In these optical fiber connectors, a pair of optical fibers is centered and abutted inside a centering device and either adhesively bonded or mechanically wedged into fixation on the centering device.

In these types of optical fiber connectors, the optical fibers are not freely detachable because the connected optical fibers are adhesively bonded so that their reuse becomes impossible, thus leaving the problem that they cannot be used effectively when changing the connections or the like.

Additionally, since extremely high precision is required for the work of inserting the optical fibers into the centering devices, the ease of the work decreases. For example, a microscope must be used in order to insert an optical fiber into a microcapillary, causing a lot of trouble in the work. Consequently, the development of an optical fiber connector capable of improving the ease of centering particularly in on-site work has been desired.

In addition, while structures for guiding the optical fibers to the centering devices through guide grooves or capillaries having low centering precision have been offered, the optical fibers get caught between these guide grooves or capillaries and the centering devices due to the sudden change in the centering precision, thus leaving something to be desired with regard to the ease of the work of inserting optical fibers into the centering devices.

The present invention has been achieved in consideration of the above-mentioned problems, and has the object of offering an optical fiber connector wherein the ease of the work of centering the optical fiber is improved, and it is possible to change the connections of optical fibers which have already been connected.

DISCLOSURE OF THE INVENTION

The present invention has a structure wherein an optical fiber pinched inside an element by the biasing force of a spring is held by a clamp. Additionally, since a centering mechanism for positioning and centering the optical fibers such as to be capable of being adjoined and connected is provided on at least one or between opposing faces of the base and the lid member which are mutually juxtaposed with a counterpart side, both optical fibers to be connected can be positioned and centered for adjoinment by the centering mechanism for precise adjoinment and connection, and the state of adjoinment of the optical fibers can be maintained by applying pressure between the base and the lid member after adjoinment and connection. Examples of springs include C-shaped springs as mentioned below as well as square springs and others. Additionally, the optical fiber used with the optical fiber connector of the present invention may be either glass or plastic.

If the structure is made such that between the base and the lid member, a wedge insertion groove for inserting a wedge from outside is formed so that by pressing a wedge into the wedge insertion groove, the biasing force of the spring is opposed to push apart the base and the lid member, the element can be opened and closed by means of an insertion and withdrawal operation of the wedge into the wedge insertion groove. When connecting or releasing a connection of optical fibers, the element is opened by inserting the wedge into the wedge insertion groove. As a result, it is possible to switch connections with the optical fiber connector.

By making the structure such that wedge insertion grooves are formed at a plurality of locations on both sides in the longitudinal direction of the base and the lid member for example, the element can be partially opened by selecting the wedge insertion groove to insert a wedge, so that during connection switching for example, it becomes possible to perform work such as exchanging only one optical fiber while holding the other optical fiber which is to be connected to that optical fiber in a clamped state. The wedge insertion grooves are preferably provided at equivalent intervals along the same plane, as a result of which the work of moving the wedge when selecting the wedge insertion grooves for insertion of the wedge is simplified.

If an opening piece which is withdrawn after insertion of the optical fibers into the element is pre-inserted into the wedge insertion groove, the element is held in a open state until the opening piece is withdrawn so as to enable insertion of optical fibers into the element, and by withdrawing the opening piece from the wedge insertion groove after completion of the work of adjoining and connecting the optical fibers, the element is closed so as to hold the optical fibers in a state of adjoinment. This opening piece is suitable for use during shipping of the optical fiber connector or the like.

When an engaging projection and an engaging recess are provided at the opposing faces of the base and lid member for positioning them relative to each other in their planar direction, at positions which oppose the wedge insertion groove with respect to the centering axis of the centering mechanism, the relative positional misalignment between the base and the lid member which accompanies the operation of opening and closing the element is prevented by engagement between the engaging projection and the engaging recess, so that a desired centering position of the optical fiber due to the centering mechanism is maintained. The engaging projection and the engaging recess are positioned so as to oppose the wedge insertion grooves, so that interference with insertion and withdrawal of the wedges at the wedge insertion grooves is avoided. Additionally, for example, if a structure wherein the engaging projection and the engaging recess engage with relative rotation possible centered on the axis of the centering axis is employed, then the engaging projection and the engaging recess act as a hinge so as to allow relative rotation of the base and lid member by insertion and withdrawal of the wedges into the wedge insertion groove, thus making the operation of opening and closing the element smooth.

Additionally, the present invention may have a structure wherein the lid member composed of a central lid positioned in correspondence to the centering mechanism and a pair of end lids positioned on both sides of the central lid along the direction of the centering axis of the centering mechanism.

According to this structure, by changing the material, shape or molding precision of the central lid and the end lids, it is possible to respond efficiently to clamping of each portion of the optical fiber, thus enabling the optical fiber to be clamped and held more stably. That is, while a high level of molding precision is required for the central lid, a clamping force on the optical fiber is required for the end lids, so that by changing the material, shape or molding precision between the central lid and the end lids, it is possible to flexibly meet these requirements. For example, a structure wherein the central lid and end lids are separate such that the optical fiber cores are held so as to clamp the naked fibers exposed at the tips of the optical fiber cores between the base and the central lid in the vicinity of the centering mechanism, and clamp the covered portions of the optical fiber cores between the base and the end lids at other portions simplifies clamping which is responsive to differences of diameter and the like between the naked fibers and the covered portions, as well as allowing the clamped state of the naked fibers to be held stable due to influences such as vibrations and shocks not being transmitted to the central lid, as opposed to the end lids which are positioned to the outsides of the optical fiber connector and therefore easily receive such influences. Additionally, it is easy to increase the centering precision of optical fibers clamped by the central lid without any dependence on the centering precision of optical fibers clamped by the end lids, so that it is possible to obtain a high centering precision in the vicinity of the centering mechanism, as a result of which a desired connection loss can be stably obtained.

The present invention may have a composition wherein the element is formed from materials which are transparent or have translucence (semi-transparent). By employing these, the state of insertion of the optical fibers inside the element can be confirmed from outside the element. Additionally, when adjoining the optical fibers for connection, any light leaking from the position of adjoinment which is radiated when there is a large misalignment between the adjoined optical fibers can be viewed from outside the element, thereby allowing the state of connection of the optical fibers to be confirmed from outside the element.

The present invention can also have a structure wherein the element is inserted inside a C-shaped spring having a tubular shape with a C-shaped cross section, with a pressing force on the base and the lid member being applied by the C-shaped spring. The element is inserted with the wedge insertion grooves aligned with the opening portion on the side surface of the C-shaped spring, so that the element can be opened and closed by operation of the wedge from outside the C-shaped spring. Additionally, when the wedge is inserted or withdrawn from the wedge insertion grooves, the C-shaped spring, the base, and the lid member are opened and closed by unitarily rotating centered about the far side of the C-shaped spring opposing the opening portion. When an element using a lid member composed of the three parts of a central lid and end lids is inserted inside the C-shaped spring, the central lid is positioned in the central portion along the longitudinal direction of the C-shaped spring, and the end lids are positioned at the end portions in the longitudinal direction of the same, so that the tips of the optical fibers inserted into the element from both end portions in the longitudinal direction of the C-shaped spring are adjoined into connection between the central lid and the base. The element should preferably have an elliptical, square or hexagonal cross sectional shape, by means of which the biasing force of the C-shaped spring can be applied in concentration on the optical fibers held in the element.

The present invention may also have a structure wherein a tool engaging surface for restricting axial rotation of the element by engaging with a tool is formed on the side surface of the element exposed in a state of protrusion from the end portions in the longitudinal direction of the C-shaped spring, which enables the ease of insertion and withdrawal of the wedge into the wedge insertion grooves to be increased by holding the element by engaging the tool engaging surface with a tool. Additionally, by providing a rotation restricting projection and a rotation restricting recess on the C-shaped spring and the element for mutually engaging to restrict their relative axial rotation of the C-shaped spring and the element, the wedge insertion grooves can be positioned and fixed at the opening portion of the C-shaped spring so that positional misalignment can be restricted, and positional misalignment does not occur even when the element is opened and closed. Additionally, the C-shaped spring is divided by division slits which are formed at a plurality of locations along the longitudinal direction, and by each portion functioning as a spring for applying pressure separately to the central lid and the end lids as recited in claim 6, clamping and holding suited to each portion of the optical fiber is possible, while also enabling clamping and clamp release of the optical fiber to be performed separately between the central lid and the end lids, thereby increasing the case of switching connections and the like.

If a structure is employed wherein the centering mechanism is a centering groove composed of a V groove or a U groove, or a microcapillary, the centering mechanism is able to be made extremely small, so that the optical fiber connector itself can also be made more compact.

When a structure wherein optical fiber guide grooves for guiding the optical fibers to the centering mechanism is formed in the base, a guide recess for exposing each optical fiber guide groove is formed in the lid member, and the optical fibers can be inserted into the centering groove by passing from the guide recesses through the optical fiber guide grooves is employed, it is possible to easily insert the optical fibers into the desired optical fiber guide groove by inclining the optical fibers and aligning their tips with respect to the optical fiber guide grooves exposed at the guide recesses.

Additionally, when a structure comprising optical fiber guide grooves formed with a lower centering precision than the centering mechanism, and a centering guide portion provided between the centering mechanism and an optical fiber guide grooves for guiding the optical fibers guided from the optical fiber guide grooves to the centering mechanism, wherein said centering guide portion is formed into a tapered shape such that the centering precision increases in approaching the centering mechanism side is employed, the optical fibers inserted into the optical fiber guide grooves from the end portions in the longitudinal direction of the element can be inserted into the centering mechanisms simply by pushing them in the direction of the centering mechanisms.

Hereinbelow, a case of a structure wherein the centering mechanisms are centering grooves formed in one or both of the opposing faces of the base and the lid member is employed shall be explained.

The centering grooves are shaped to a depth such that the optical fibers protrude from the opposing face by at least 20 microns, such that a clearance is formed between the base and the lid member when the optical fibers housed in the centering grooves are clamped. When this structure is employed, the pressing force between the base and the lid member acts concentrated on the optical fiber, so that the optical fibers can be positioned and centered reliably and with high precision. When one optical fiber is to be clamped, the pressing force between the base and the lid member is concentrated on that optical fiber, and relative rotation between the base and the lid member centered about the optical fiber is permitted, so that the pressing force is reliably applied.

The centering grooves can be formed on a centering chip built into the element, and when this structure is employed, a high level of processing precision can be obtained by using materials with good processability in this centering chip, thereby enabling the centering precision of the optical fibers to be increased. As examples of materials for the centering chip, it is possible to use zirconia, ceramics, hard synthetic resins, or hard metals. When a centering chip is not employed, the processing precision of the centering grooves can be increased by forming one of the base and the lid member from a hard material, or by forming only the areas of the base or lid member near the centering grooves from hard materials.

When a plurality of centering grooves which are the centering mechanism are formed on the opposing face on one or both of the base and the lid member, it is possible to have a structure comprising a separation distance maintaining portion which protrudes from at least one or is provided between both of the opposing faces of the base and the lid member, such that the pressure acting between the base and the lid member when the optical fibers housed in the centering grooves are clamped is held uniform by the optical fibers and the separation distance maintaining portion. This separation distance maintaining portion should preferably be provided at a position of the element opposing the wedge insertion grooves with respect to the centering grooves, whereby the pressing force is prevented from being concentrated on the optical fibers in the centering grooves separated from the wedge insertion groove when the element is opened or closed.

Additionally, the structure may comprise a plurality of centering mechanisms which are provided such that their centering axes are parallel, wherein the optical fiber guide grooves for guiding the optical fibers to the centering mechanisms are provided on one or both of the base and the lid member, and covered portion housing portions are provided between the base and the lid member for housing the covered portions of the optical fibers which are inserted into the centering grooves from the optical fiber guide grooves. When a plurality of centering grooves are provided in parallel, this is suitable for connecting optical fiber tape cores formed from a plurality of naked fibers which are bundled in tape-fashion by means of a covering material. That is, in this type of optical fiber connector, the plurality of single-core naked fibers exposed at the tips of the optical fiber tape cores by removing the covering are respectively held in position by desired centering mechanisms, and the covered portions are housed in covered portion housing portions. When the naked fibers inserted into the optical fiber guide grooves are pushed into their respectively desired centering mechanisms, the covered portions of the optical fiber tape cores are inserted into the element and run over the optical fiber guide grooves to be housed in the covered housing portion.

BEST MODE FOR CARRYING OUT THE INVENTION

Hereinbelow, the present invention shall be explained in further detail with reference to the attached drawings.

FIGS. 1–5 show optical fiber connectors according to a first embodiment of the present invention.

Figure 1:
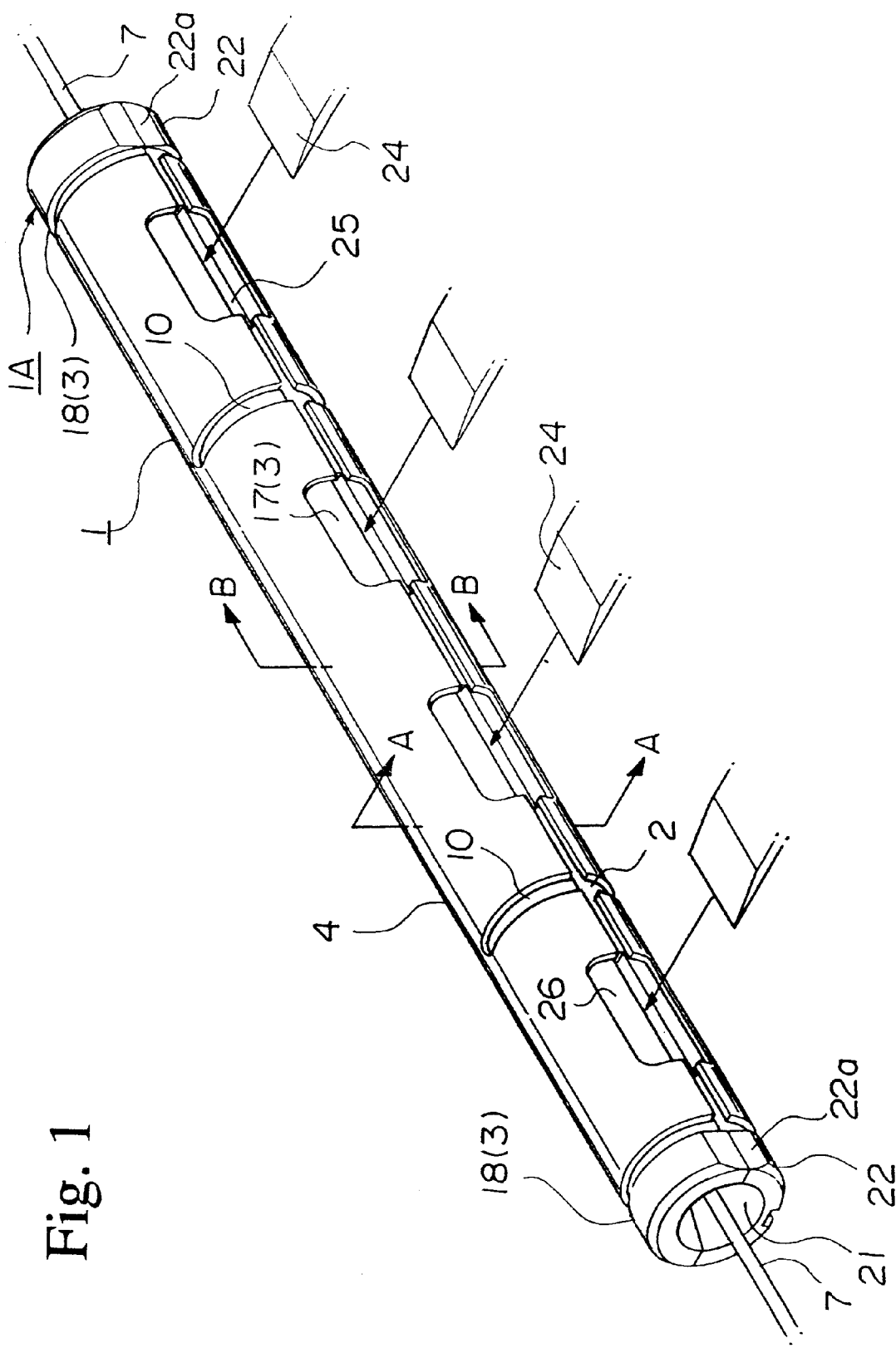
FIG. 1 is a drawing showing first embodiment of an optical fiber centering device of the present invention, and is an overall perspective view showing an optical fiber connector.
Figure 2:
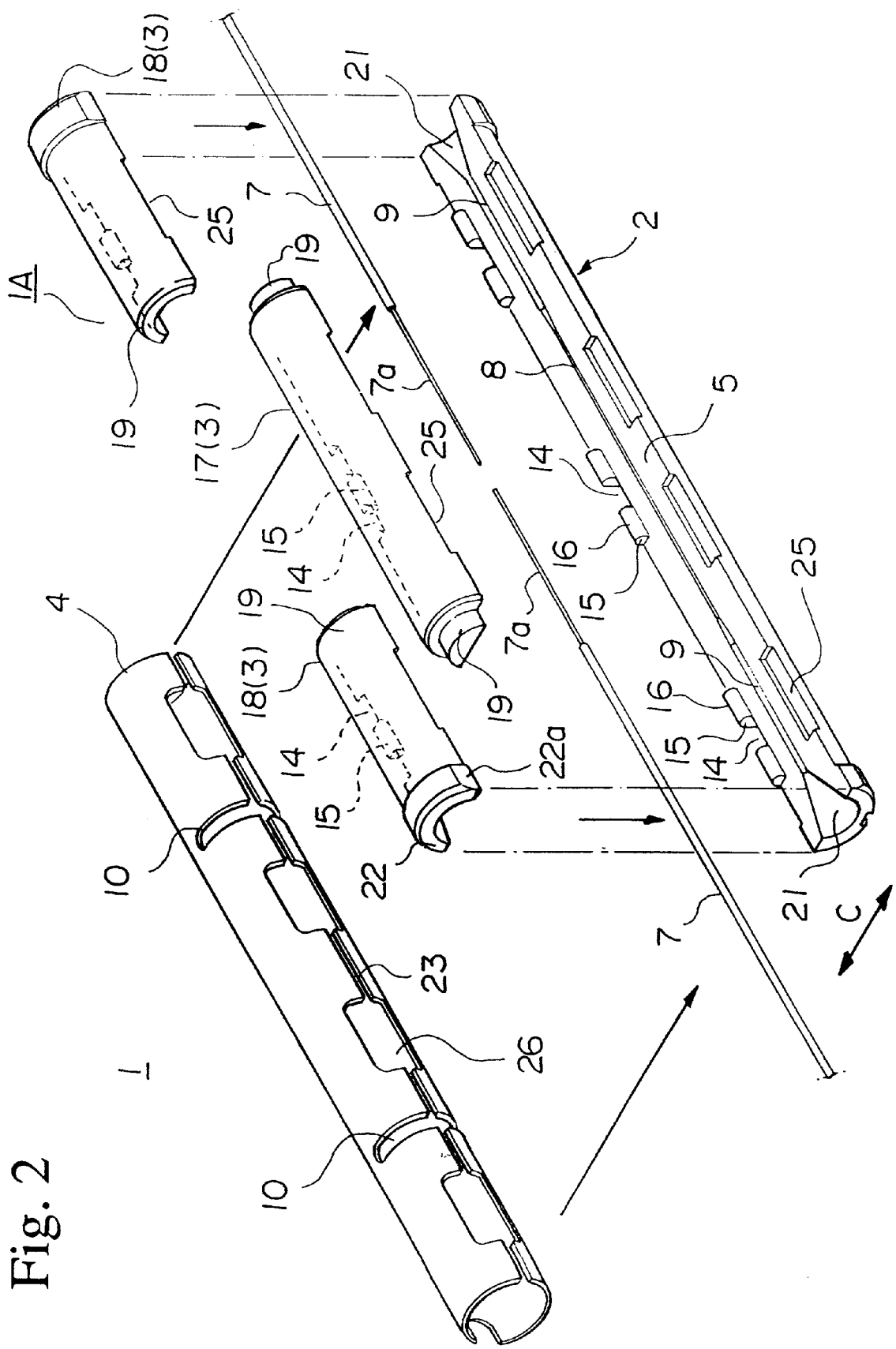
FIG. 2 is an exploded perspective view showing the optical fiber connector of FIG. 1.

In the drawings, reference numeral 1 denotes an optical fiber connector according to the present embodiment. As shown in FIGS. 1 and 2, this optical fiber connector 1 comprises an element 1A composed of a base 2 and a lid member 3 which have a split structure which forms a roughly elliptical cross-sectional rod shape when united, and a long C-shaped spring 4 which is capable of housing approximately the entirety of the element 1A.

Figure 4:
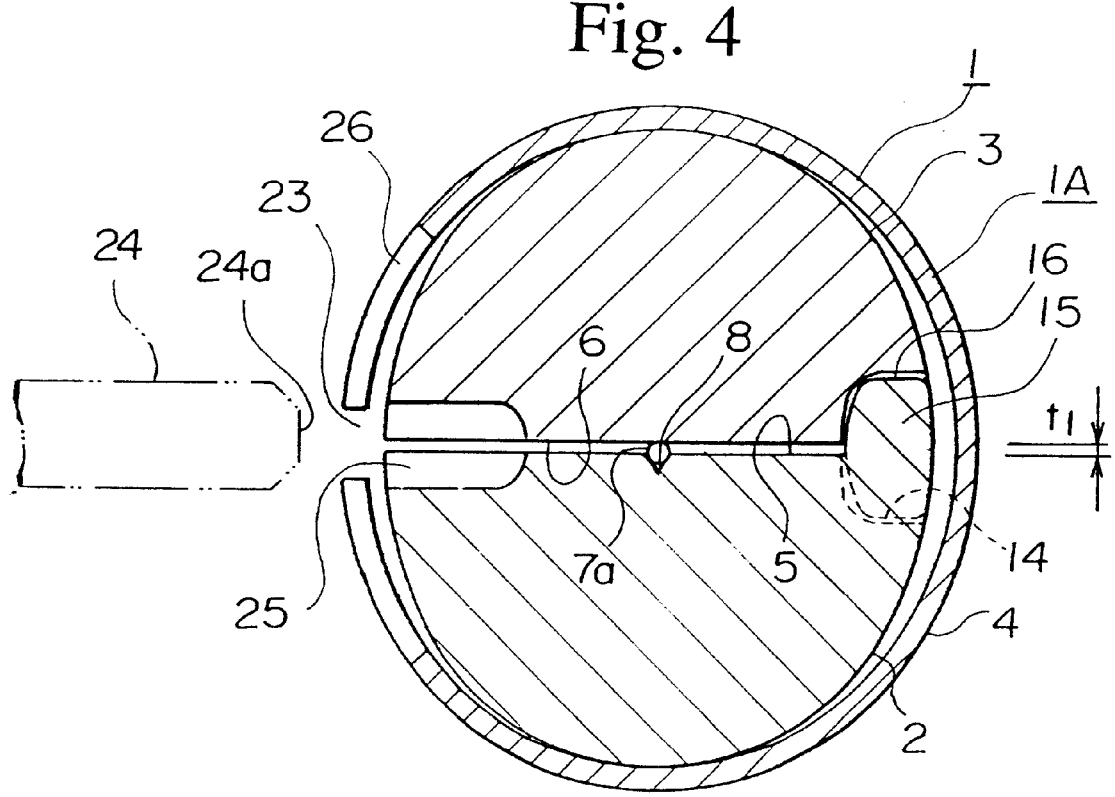
FIG. 4 is a section view along the line B—B of the optical fiber connector of FIG. 1.

As shown in FIGS. 2 and 4, the base 2 and the lid member 3 are both semi-elliptical rod-shaped members, which are mutually separable at their opposing faces 5, 6. The element 1A is housed inside the C-shaped spring 4 such that the base 2 and the lid member 3 oppose each other on both sides in the direction of action of the biasing force of the C-shaped spring 4. As a result, the major axis of the cross-sectional ellipse is aligned with the direction of action of the biasing force of the C-shaped spring 4, so that the pressing force between the base 2 and the lid member 3 is stabilized. As examples of materials for use in the base 2 of the present embodiment, there are hard synthetic resins such as thermosetting epoxy resins, metals such as aluminum, and ceramics, and examples of materials for use in the lid member 3 include thermosetting epoxy resins or plastics which are softer than the base 2. Additionally, if material which are transparent or translucent are used as the materials for forming the base 2 and the lid member 3, then the state of insertion or state of adjoinment of the optical fibers 7 (single-core optical fibers) can be confirmed by eye.

The optimum types of optical fiber 7 to use in the optical fiber connector 1 of the present invention are the CCITT standard 125 μm cladding diameter SM (single mode) types or GI (graded index) types. Large diameter optical fibers (including those for purposes other than communications) may also be used. Additionally, when applied to the connection of large-diameter optical fibers, it is of course possible to make various design modifications such as the depths of the centering grooves 8 or optical fiber guide grooves 9, or the clearance maintained between the base 2 and the lid member 3 when clamping the optical fibers.

Figure 3:
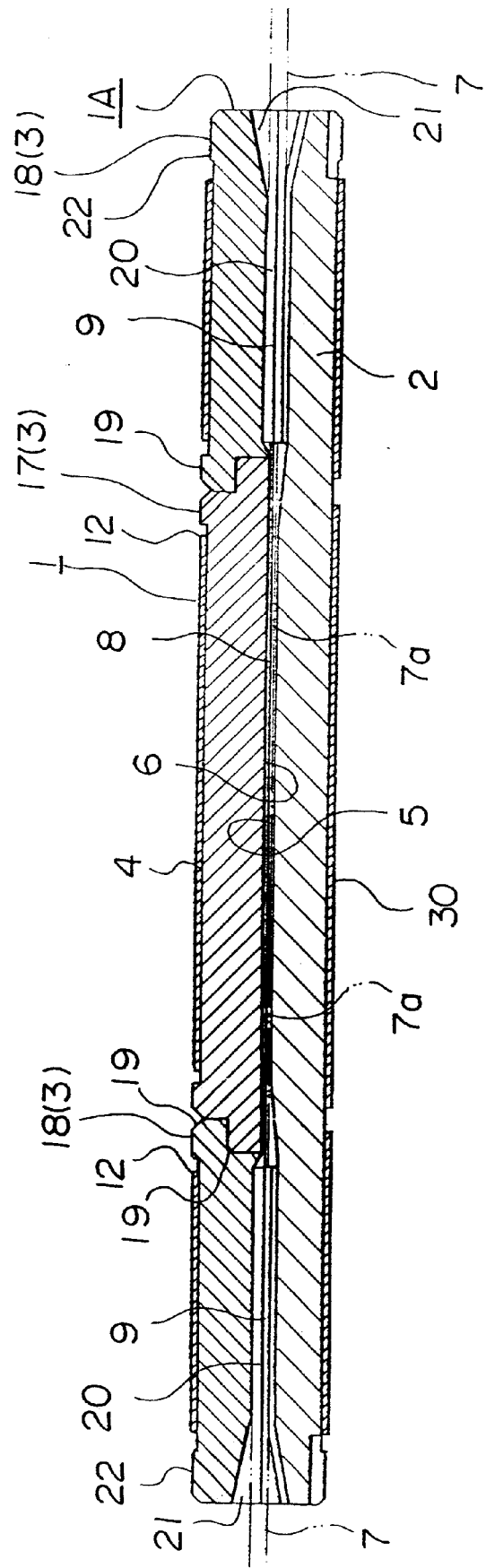
FIG. 3 is a section view along the line A—A of the optical fiber connector of FIG. 1.

As shown in FIGS. 2 and 3, a centering groove (V groove) 8 for positioning and centering the optical fibers 7 to enable them to be adjoined and connected is formed in the central portion in the longitudinal direction of the opposing face 5 of the base 2, and optical fiber guide grooves 9 (V grooves) for guiding the optical fibers 7 inserted from outside the base 2 near the centering groove 8 are provided at both ends in the longitudinal direction of the opposing face 5. The centering groove 8 and optical fiber guide grooves 9 are provided colinearly along the longitudinal direction of the base 2. As the centering groove 8 and the optical fiber guide grooves 9, it is also possible to employ U grooves aside from V grooves.

Naked fibers 7a which are exposed by removing the coverings at the tips of the optical fibers 7 are housed in the centering groove 8, and the covered portions of the optical fibers 7 are housed in the optical fiber guide grooves 9. As shown in FIG. 4, the centering groove 8 precisely centers the naked fibers 7a when the naked fibers 7a exposed from the optical fibers 7 are housed therein, and is formed so that the naked fibers 7a protrude by $t_1 = 30 \mu m$ from the opposing face 5.

Figure 5:
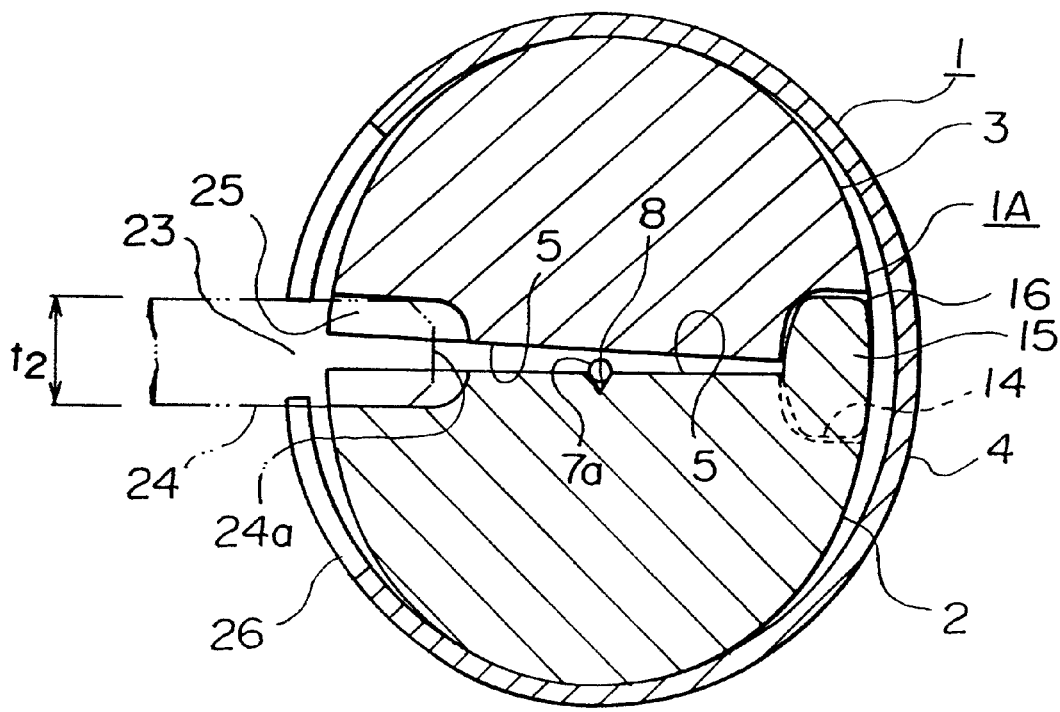
FIG. 5 is a section view along the line B—B showing the state in which the clamping force on the optical fiber core is released by inserting a wedge into the elements of the optical fiber connector of FIG. 1.

As shown in FIG. 2, at three locations along the longitudinal direction of the opposing face 5 of the base, engaging projections 15 which engage with engaging recesses 14 formed in the opposing face 6 of the lid member are formed, and engaging recesses 14 which engage with engaging projections 15 which protrude from the opposing face 6 of the lid member are formed. Curved surfaces 16 which allow relative rotation with respect to the engaging recesses 14 are formed on the tips of the engaging projections 15. As shown in FIGS. 4 and 5, the axes of relative rotation of all of the groups of engaging recesses 14 and engaging projections 15 which are engaged when the base 2 and the lid member 3 are united are positioned colinearly along one side in the radial direction of the element 1A (the direction of arrow C in FIG. 2 and left-right in FIGS. 4 and 5. Relative rotation between the base 2 and the lid member 3 is possible with this line as the axis. The axis of relative rotation between the base 2 and the lid member 3 is parallel to the axis of the optical fiber connector 1, and is positioned at a side portion of the optical fiber connector 1, so that the mutually engaged engaging recesses 14 and engaging projections 15 perform the function of an opening/closing hinge between the base 2 and the lid member 3.

As shown in FIGS. 2 and 3, the lid member 3 is constructed from the three parts of a central lid 17 corresponding to the centering groove 8 of the base 2 and end lids 18 corresponding to the optical fiber guide grooves 9, which are arranged serially. The central lid 17 and the end lids 18 are serially coupled by mutually engaging coupling end portions 19 which project toward the counterpart sides to which they are to be coupled.

As shown in FIG. 3, optical fiber housing grooves 20 for housing the upper portions (top side in FIG. 3) of the optical fibers 7 housed in the optical fiber guide grooves 9 are formed in both end lids 18.

While the opposing face 6 of the central lid 17 is flat, it is also possible to form a naked fiber housing groove for housing the upper portions of the naked optical fibers 7a which are housed in the centering groove 8 at a position corresponding to the centering groove 8. Consequently, it is also possible to accept naked fibers 7a of larger diameters. However, even when a naked fiber housing groove is formed in the opposing face 6 of the central lid 17, a clearance is formed between the opposing faces 5, 6 when the naked fiber 7a is clamped.

Additionally, the opposing face 6 of the central lid 17 needs to have a high degree of flatness in only the portion opposing the centering groove 8, and the other portions may simply be of a flatness such as not to easily contact the opposing face 5 on the base 2 side when the optical fiber 7 is clamped.

As shown in FIGS. 1 and 3, funnel-shaped insertion recesses 21 for inserting the optical fibers 7 into the optical fiber guide grooves 9 are formed on both ends in the longitudinal direction of the element 1A. Additionally, since tool engaging faces 22a are formed in the side surfaces of the exposed portions 22 of the C-shaped spring 4 which are always exposed on the end portions in the longitudinal direction of the element 1A, they are convenient for affixing tools and the like.

As shown in FIGS. 1 and 4, wedge insertion grooves 25 for inserting wedges 24 to open the base 2 and lid member 3 are opened in the other side portion in the radial direction of the element 1A (the side opposite to the engaging recesses 14 and engaging projections 15). The wedge insertion grooves 25 are formed by gouging out the opposing faces 5, 6 of the base 2 and lid member 3 at four locations along the longitudinal direction of the element 1A, and are made so that the base 2 and lid member 3 are pushed apart by pressing in a wedge 24 in opposition to the clamping force of the C-shaped spring 4. The element 1A is inserted into the C-shaped spring 4 such that the wedge insertion grooves 25 are exposed to the open portion 23 of the C-shaped spring 4.

When wedges 24 are pressed into the wedge insertion grooves 25, the base 2 and the lid member 3 relatively rotate in the direction of expansion of the wedge insertion grooves 25, centered about the axis of rotation formed by the engaging recesses 14 and the engaging projections 15 which are engaged. The wedges 24 are pressed in such that the tip faces 24a which are shaped flatly contact the furthest portions of the wedge insertion grooves 25. Additionally, as shown in FIG. 5, the wedges 24 have a thickness $t_2$ which corresponds to the target opening width of the wedge insertion grooves 25, so that it is always possible to open the wedge insertion grooves 25 stably and at a constant opening amount simply due to contact with the furthest portions of the wedge insertion grooves by inward pressure.

The C-shaped spring 4 has a elongate sleeve shape which is slightly shorter than the element 1A, and is composed of materials such as stainless steel or beryllium bronze. In the case of beryllium bronze, they should more preferably be age hardened or coated with fluorine resins or the like after heat treatment after being molded into the desired shape.

As shown in FIGS. 1 and 2, wedge insertion windows 26 are formed in the open portion 23 of the C-shaped spring 4 at a plurality of locations corresponding to the wedge insertion grooves 25 of the element 1A.

In FIG. 1, reference numeral 10 denotes division slits which divide the C-shaped spring 4 into a total of three portions corresponding to the central lid 17 and the end lids 18. Consequently, the clamping force of the C-shaped spring 4 acting on the element 1A acts independently on the central lid 17 and end lids 18. Additionally, since the wedge insertion grooves 25 are also formed at positions corresponding to the central lid 17 and end lids 18, the desired portions of the element 1A corresponding to the central lid 17 and end lids 18 can be separately opened and closed by operating with a wedge 24.

Figure 6:
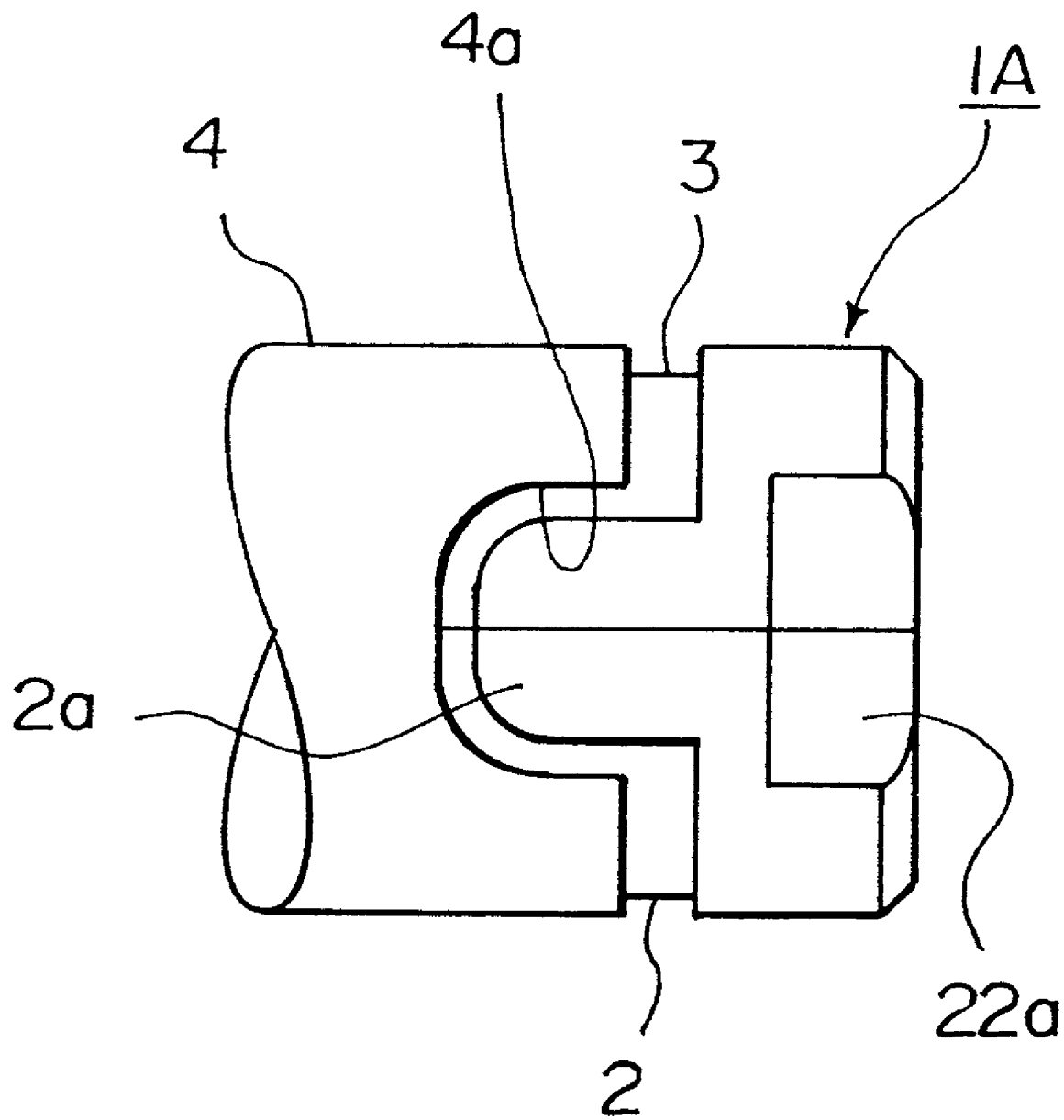
FIG. 6 is a partially enlarged rear view showing the rotation restricting projection and the rotation restricting recess of the present invention.

FIG. 6 shows a rotation restricting projection 2a and rotation restricting recess 4a for restricting the mutual rotation of the element 1A and the C-shaped spring 4. In the drawing, the rotation restricting projection 2a is a projection formed in the element 1A, and the rotation restricting recess is a notch formed in the C-shaped spring 4. The wedge insertion groove 25 and wedge insertion window 26 are held in a state of alignment by the engagement of the two, thereby increasing the ease of insertion and withdrawal of the wedge 24.

The mode may also be such that a rotation restricting projection protruding on the C-shaped spring 4 side is engaged with a rotation restricting recess formed in the element 1A.

Figure 7:
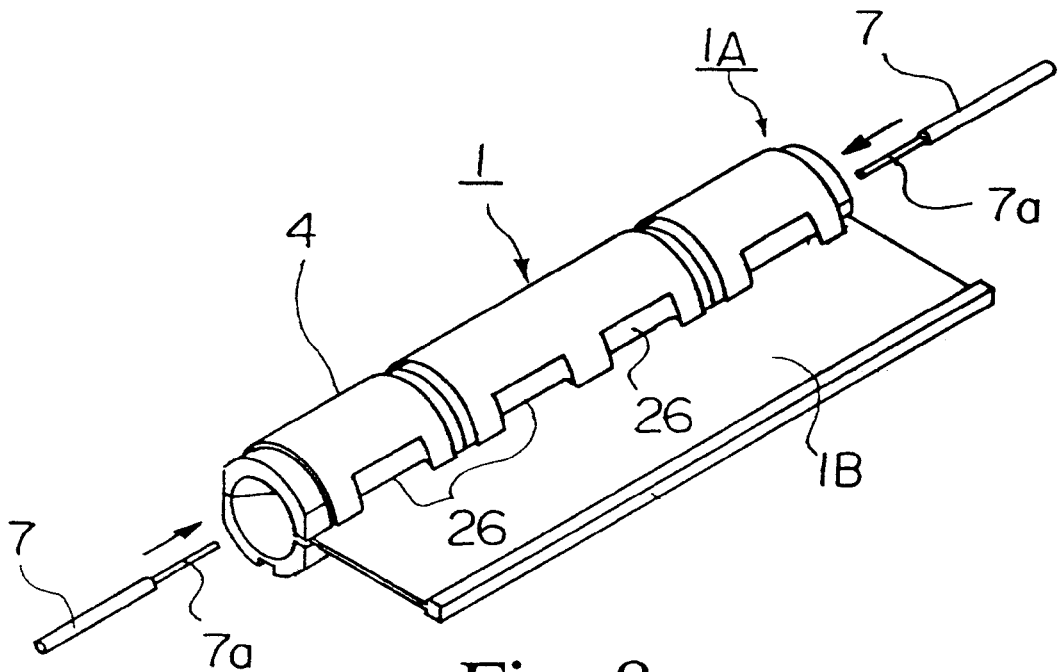
FIG. 7 is a perspective view showing an opening piece.
Figure 8:
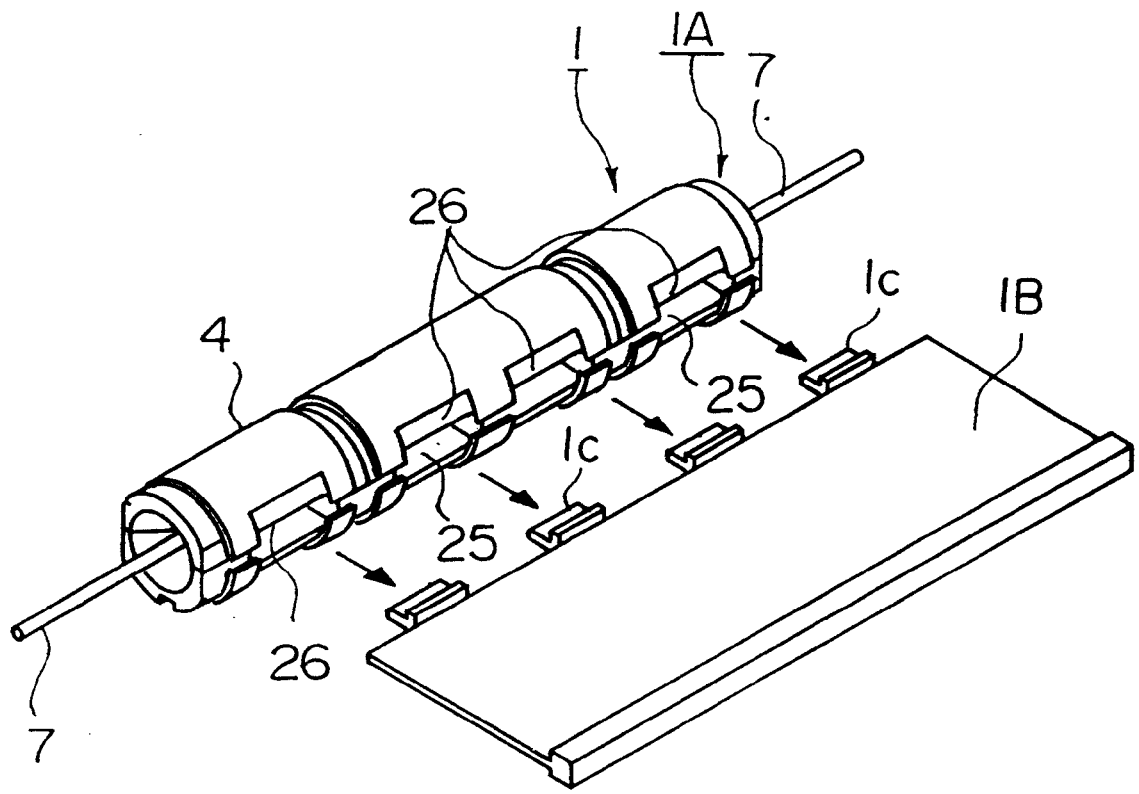
FIG. 8 is a perspective view showing the opening piece in a state of being withdrawn from the elements.

In FIGS. 7 and 8, 1b denotes an opening piece. The opening pieces 1B are used primarily during manufacture and shipment of the optical fiber connectors 1, and by inserting the insertion end portions 1C having tip shapes identical to the wedges 24 into the wedge insertion grooves 25, the element 1A is held in an open state. As a result, while the optical fibers 7 can be freely inserted and withdrawn due to the element 1A being held in an open state until the opening piece 1B is withdrawn, when the adjoinment of the optical fibers 7 is completed, the element 1A is closed by withdrawing the opening piece 1B from the element 1A, so that optical fibers 7, 7 are clamped into the element 1A while still in a state of adjoinment.

Hereinbelow, various applicable modes for working the optical fiber connector 1 of the present embodiment shall be described.

Figure 9:
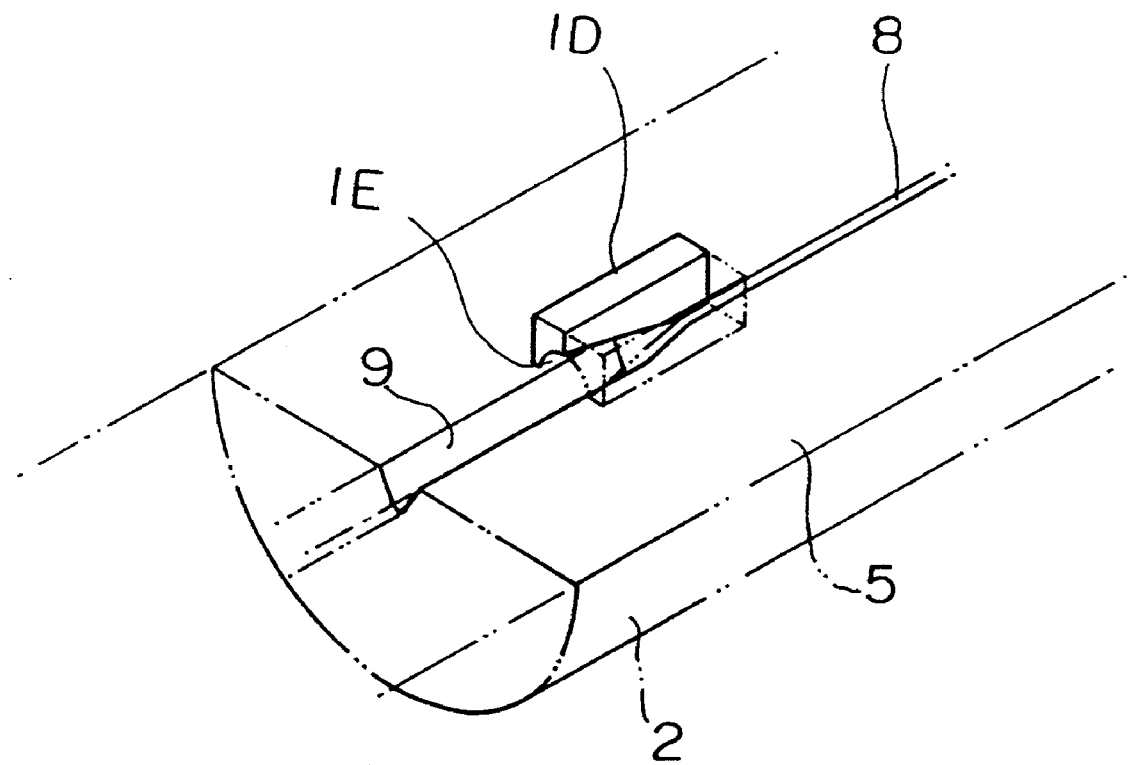
FIG. 9 is an enlarged perspective view of an essential part of the centering guide portion.
Figure 10:
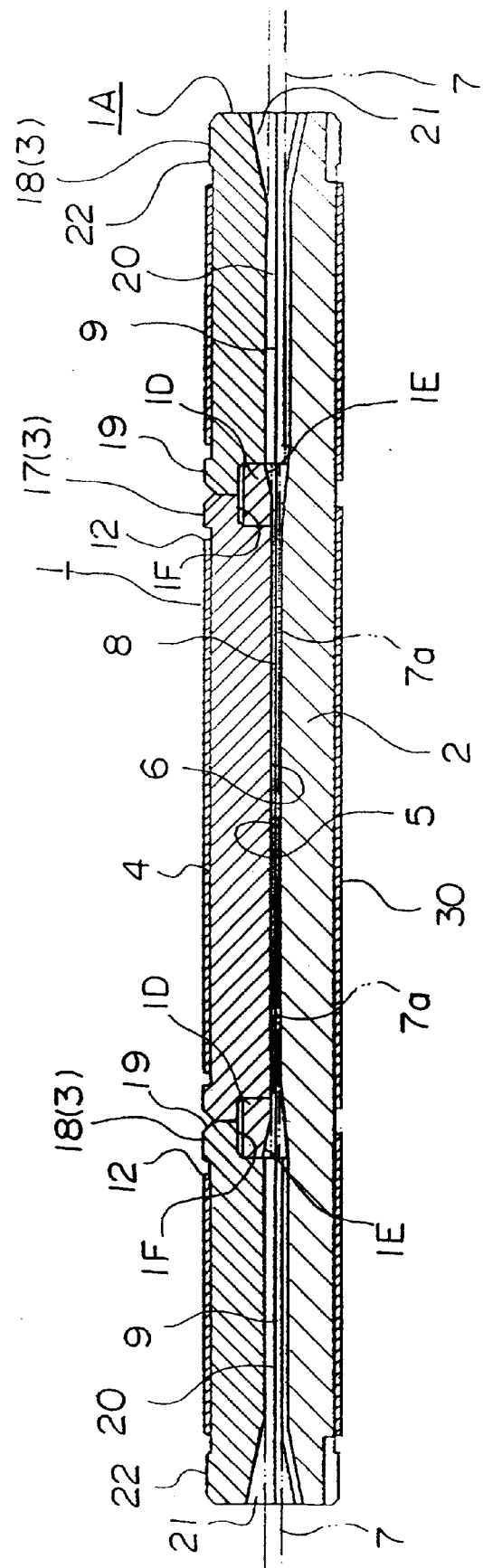
FIG. 10 is a section view showing a centering guide portion.

FIGS. 9 and 10 show a centering guide portion 1D. As shown in FIG. 9, the centering guide portion 1D is a gate-shaped projection provided on the boundary between the optical fiber guide groove 9 and the centering groove 8 on the opposing face 5 of the base 2, having a centering hole 1E communicating with the optical fiber guide groove 9 and the centering groove 8. The centering hole 1E is tapered such that the centering precision gradually increases in approaching the centering groove 8 side from the optical fiber guide groove 9 side, and insertion work can be performed smoothly by inserting a naked fiber 7a into the centering groove 8 from the optical fiber guide groove 9 through this centering hole 1E. Additionally, when using this centering guide portion 1D in the optical fiber connector of the present embodiment, a guide portion housing portion 1F for housing the centering guide portion 1D is formed in the lid member 3 as shown in FIG. 10. As a result, when the base 2 and lid member 3 are united, the centering guide portion 1D functions to relatively position the two, thereby preventing positional misalignment between the base 2 and the lid member 3 due to the opening/closing movement of the element 1A. Additionally, the centering guide portion 1D prevents the optical fiber 7 from rising from the base 2 when the element 1A is opened, so that the state of housing of the optical fiber 8 is held stable by the centering groove 8 and the optical fiber guide groove 9.

Figure 11:
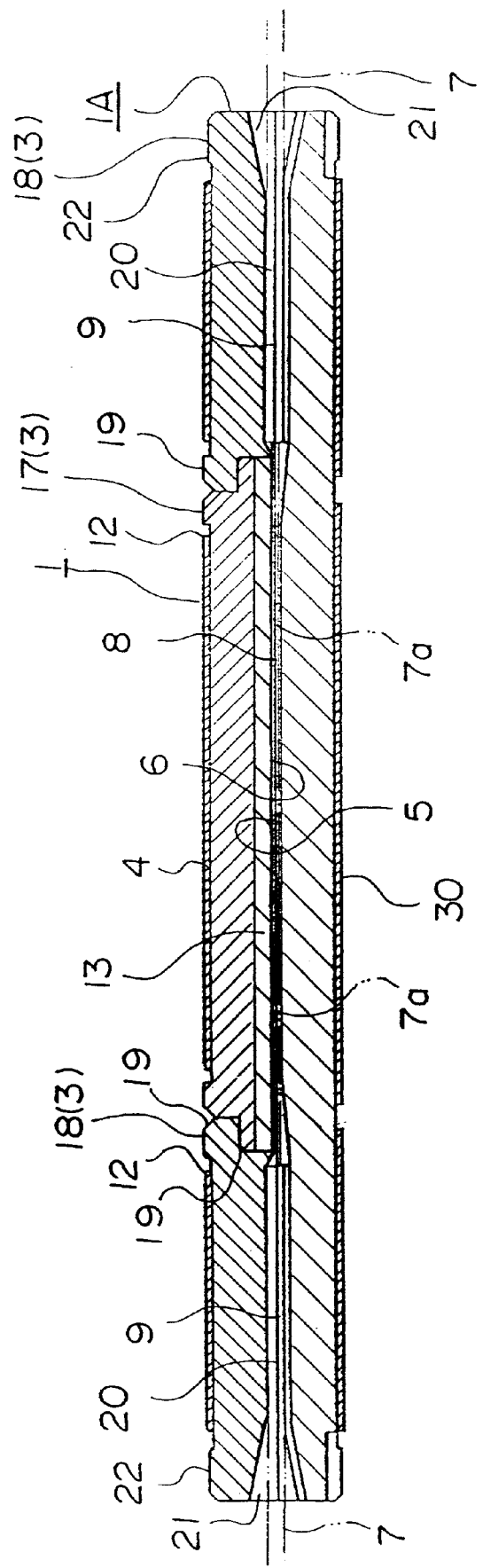
FIG. 11 is a section view showing a centering chip, in an example wherein the centering chip is provided on the lid member.

In FIG. 11, reference numeral 13 denotes a centering chip. As shown in the drawing, the centering chip 13 is composed of a material which is harder than the element 1A and allows for high processing precision, and is built into the central lid 17 by insertion molding. Materials suitable for the centering chip 13 include, for example, zirconia, ceramics, hard synthetic resins and the like. This centering chip 13 is either for forming a flat opposing surface which faces the base 2, or for forming a centering groove (not shown in the drawing) for retaining the optical fiber 7 together with the centering groove 8 on the base 8 side. In either case, a high centering precision can be obtained for the optical fiber 7 which is retained between it and the centering groove 8.

It is also possible to form a flat opposing face on the central lid 17 by fitting or bonding a centering chip 13 or forming a plating layer on the central lid 17 in latter procedures. If a plating layer is to be formed, it is preferable that a hard layer composed of metals such as chrome or the like be formed on only the parts at which the naked fibers 7a, 7a are in abutment. By so doing the centering precision of the naked fiber 7a is increased by means of the hard layer, and the naked fiber 7a is pressed into a suitable position by the portions of the central lid 17 softer than the hard layer, so that the clamped state of the naked fiber 7a is held stable. Additionally, it is possible to increase the centering precision of the naked fiber 7a by forming a soft plating layer on the centering chip 13. In this case, by forming a plating layer composed of gold, platinum, aluminum or the like at only the positions which avoid the portions at which the naked fibers 7a, 7a are in abutment, it is possible to obtain the effect of holding the clamped state of the naked fiber 7a stable.

Figure 12:
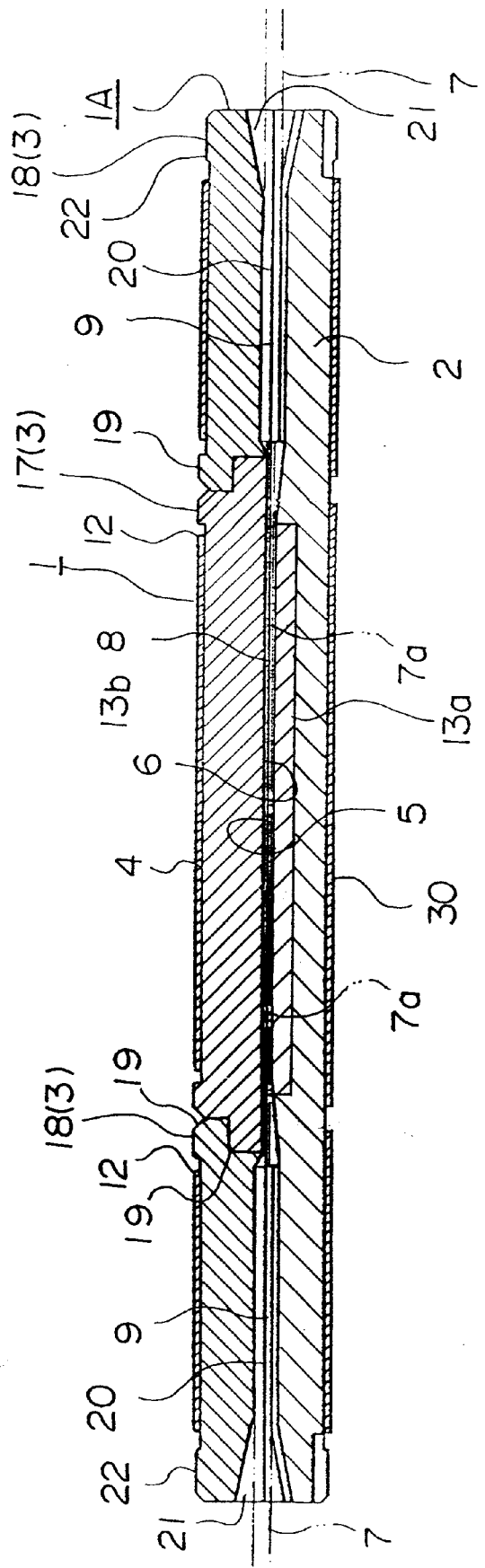
FIG. 12 is a section view showing a centering chip, in an example wherein the centering chip is provided on the base.

FIG. 12 shows a centering chip 13a built into the base 2 side by means of insertion molding. In the drawing, a centering groove 13b is formed in the centering chip 13a. Since this centering chip 13a is also formed from materials such as zirconia or ceramics which can obtain a high level of processing precision, it can further increase the centering precision of the naked fiber 7a. It is also possible to form a hard portion on the base 2 by forming a plating layer as with the central lid 17.

When the centering chips 13, 13a are placed on the element 1A, the processing precision required of other parts of the element 1A is relaxed, and it becomes possible to manufacture the element 1A from cheap materials or materials which generate a larger resistance to withdrawal when the covered portions of the optical fibers 7 are clamped.

Figure 13:
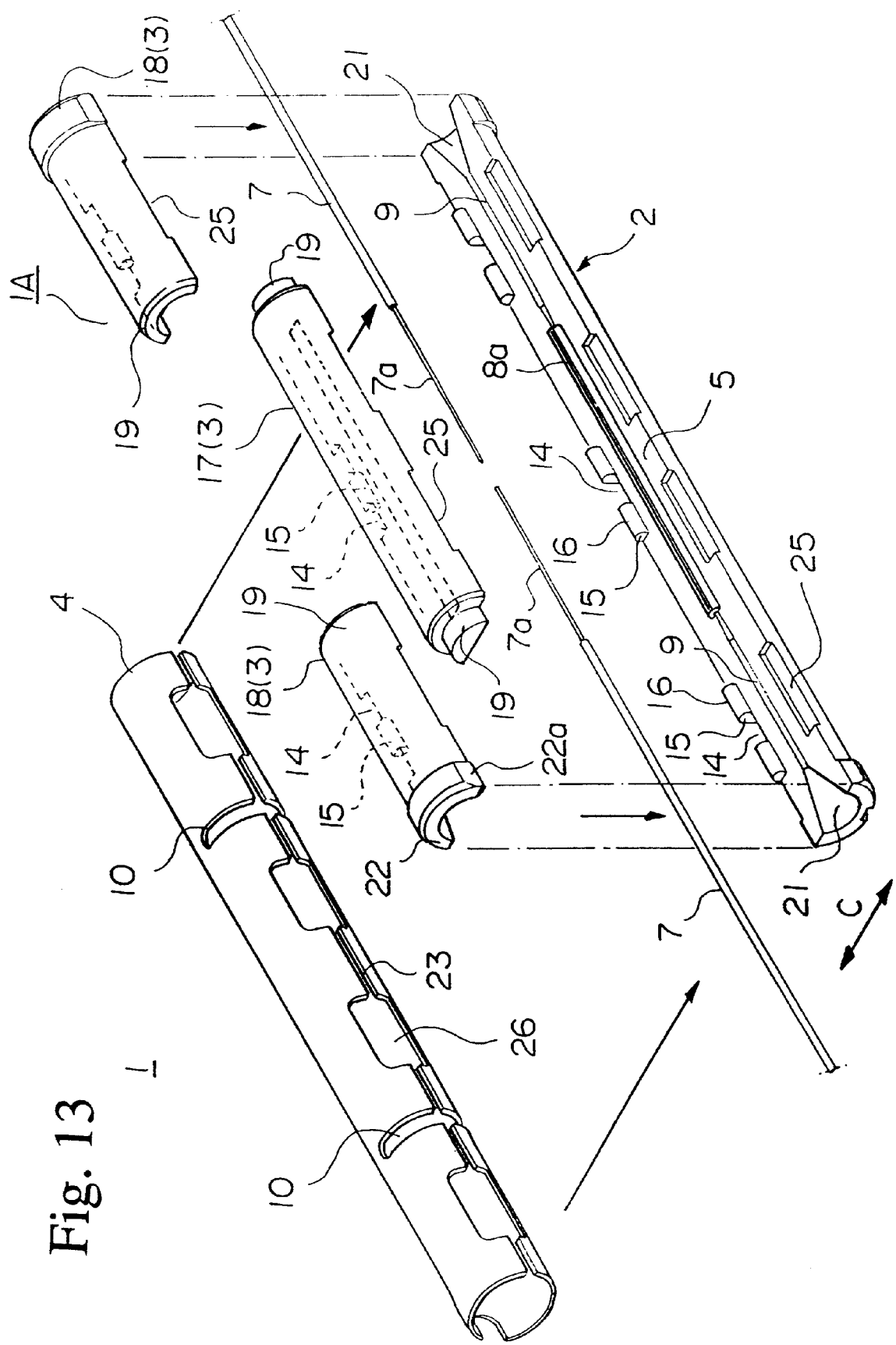
FIG. 13 is an exploded perspective view showing a microcapillary.
Figure 14:
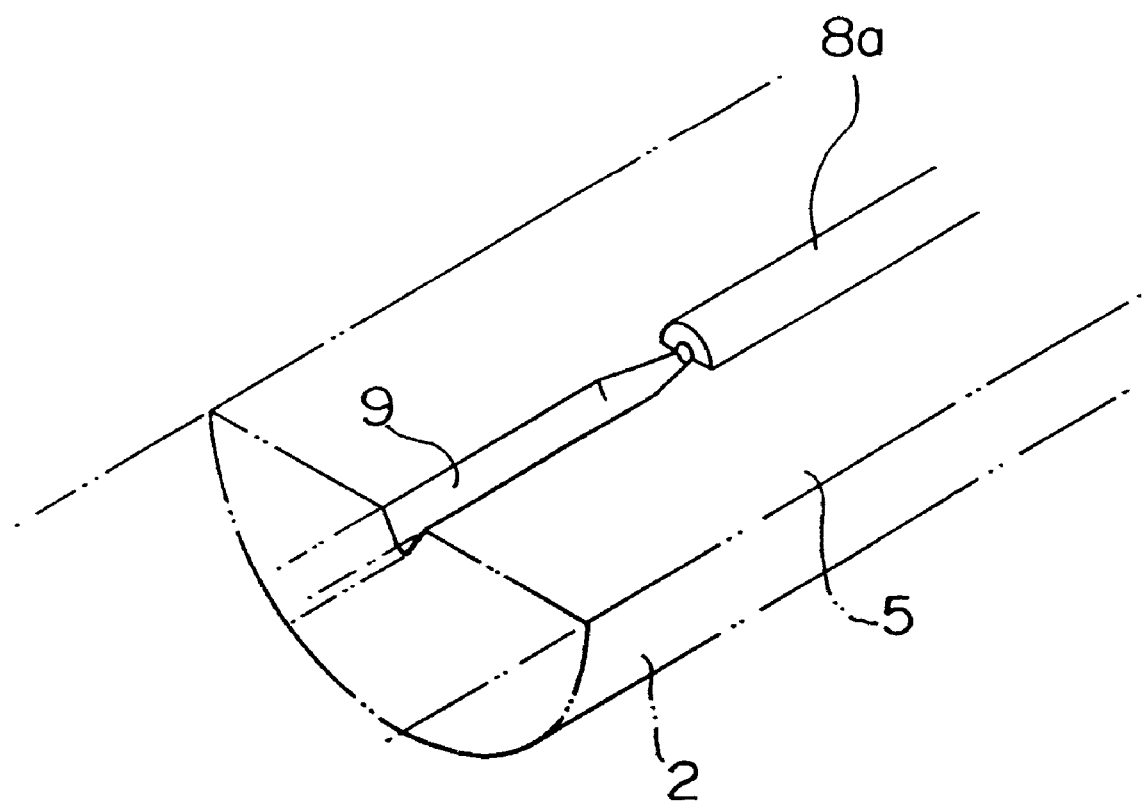
FIG. 14 is a perspective view showing an end portion of the microcapillary of FIG. 13.

FIGS. 13 and 14 show a mode wherein a microcapillary 8a is used as the centering device. As shown in the drawings, optical fiber guide grooves 9 communicate with both ends of the microcapillaries 8a, and it is possible to push optical fibers 7 into the microcapillary from the optical fiber guide groove 9 sides. In the present mode, the optical fibers 7 are adjoined inside the microcapillary 8, so that the optical fibers 7 can always be positioned and centered at a desired precision without depending on the state of clamping between the base 2 and the lid member 3. As a result, a desired connection loss can be obtained stably.

Figure 15:
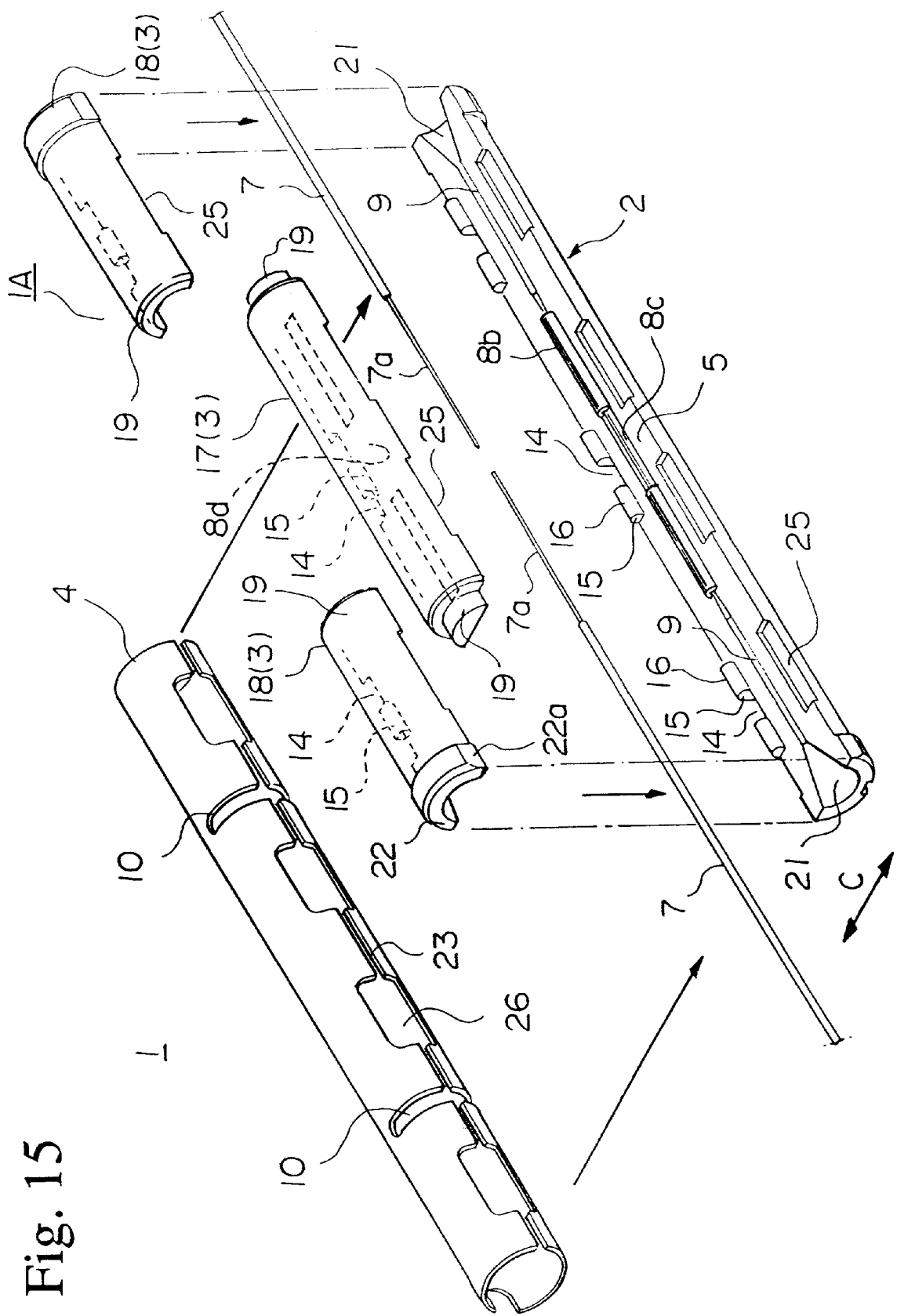
FIG. 15 is an exploded perspective view showing another example of a microcapillary.

FIG. 15 shows another mode of the microcapillary 8b. As shown in the drawing, the microcapillary 8b has an open portion 8c wherein the side portion in the central portion along the longitudinal direction is cut away, and is built into the base 2 with this open portion 8c facing the lid member 3 side. The pair of naked fibers 7a, 7a inserted from both ends of the microcapillary 8b are adjoined in the area at which the open portion 8c is formed, and by applying a pressing force between the base 2 and the lid member 3, are pressed into the microcapillary 8b by a projection 8d protruding from the central lid 17. As a result, in this mode, when the element 1A is closed, the optical fibers 7, 7 which are adjoined inside the microcapillary 8b are positioned and centered by both the microcapillary 8b and the projection 8d, so that it is possible to obtain a considerably high centering precision.

Hereinbelow, the operations and effects of the present embodiment shall be explained.

With the optical fiber connector 1 of the present embodiment, it is possible to precisely center and adjoin optical fibers 7 by loosening the clamping force between the base 2 and the lid 3 by inserting the wedge 24 into the wedge insertion groove 25 (see FIG. 5), then applying a clamping force to the element 1A after inserting the optical fibers 7 from the insertion recesses 21 of the element 1A and adjoining them in the centering groove 8.

In order to adjoin the optical fibers 7 inside the optical fiber connector 1, the optical fibers 7 are pushed toward the centering groove 8 from the insertion recesses on both sides of the element 1A. As a result, the naked fibers 7a which have been exposed at the tips of the optical fibers 7 are guided into the centering groove 8 through the optical fiber guide grooves 9, and are adjoined inside the centering groove 8.

In order to clamp the naked fibers 7a which are in adjoinment, the wedge 24 is withdrawn from the wedge insertion groove 25 and the naked fiber 7a is held between the base 2 and the central lid 17. At this time, as shown in FIG. 4, the opposing face 6 of the central lid 17 is brought into contact with only the naked fiber 7a, so as to form a gap corresponding to the width $t_1$ (=30 $\mu$m) of projection of the naked fiber 7a from the opposing face 5 between the opposing faces 5, 6 of the base 2 and the central lid 17. As a result, the clamping force between the base 2 and the central lid 17 is concentrated on the naked fiber 7a. On the other hand, the base 2 and the end lids 18 are formed such that the opposing faces 5, 6 are pressed together when the covered portion of the optical fiber 7a are clamped.

The engaging recesses 14 and the engaging projections 15 are formed such that the curved surfaces 16 of the engaging projections 15 do not contact the engaging recesses 14 when the naked fibers 7a are clamped, so that the clamping force is not applied between the base 2 and the lid member 3, and the central lid 17 and end lids 18 are positioned relative to the base 2.

In this case, the state of engagement between the coupling end portions 19 (see FIG. 3) permits relative movement of the central lid 17 toward the base 2 with respect to the end lids 18. For example, even when the diameter of the covered portions of the optical fibers 7 is large and a gap is formed between the opposing faces 5, 6 of the base 2 and the end lids 18, it is possible to clamp the naked fibers 7a between the base 2 and the central lid 17. The lateral pressure applied by the central part partitioned by means of the division slits 10 of the C-shaped panel 4 always holds the state of clamping of the naked fiber 7a normal without any dependence on the state of clamping of the covered portion of the optical fiber 7.

As a result, it is possible to reliably apply a clamping force to the entirety of the adjoined naked fibers 7a of the optical fibers 7, and the precisely centered naked fibers 7a are connected, so as to allow a high connection precision to be reliably obtained. Additionally, since the structure is such that the clamping force between the base 2 and the central lid 17 is received by only the naked fibers 7a, even if the base 2 and central lid 17 rotate about the naked fibers 7a and a relative incline exists to some extent between the opposing faces 5, 6, the clamping force acts on the naked fibers 4a in the correct orientation, so as to maintain the centering precision. Additionally, the base 2 and the lid member 3 only need to have molding precision for the centering grooves 8 and the opposing faces 5, 6 at limited parts which contact the naked fibers 7a while the naked fibers 7a are clamped. The other parts of the opposing faces 5, 6 are permitted to have protruding portions within the range of the gap $t_1$ formed when the naked fibers 7a are clamped, and the molding precision can be relaxed so that the production of the element 1A becomes simpler and the cost of the optical fiber connector 1 is able to be reduced.

If the wedges 24 are pressed into the wedge insertion grooves 25 again after the naked fibers 7a have been clamped, it is possible to release the clamp on the optical fibers 7 between the base 2 and the lid member 3, so as to allow the connection of the optical fibers 7 to be switched easily. Additionally, by selecting the wedge insertion groove 25 for inserting the wedge 24, it is possible to release the clamp of the optical fiber of only one side, thereby increasing the ease of connection switching.

FIGS. 16 through 21 show an optical fiber connector according to a second embodiment of the present invention.

In the drawings, reference numeral 50 denotes an element to be inserted into the C-shaped spring 4, 51 denotes a base, and 52 denotes a lid member.

In the optical fiber connector of the present embodiment, only the element has been changed with respect to the optical fiber connector of the first embodiment. The components which are identical to those in FIGS. 1 through 5 are denoted by the same reference numbers and their explanations are omitted.

Figure 16:
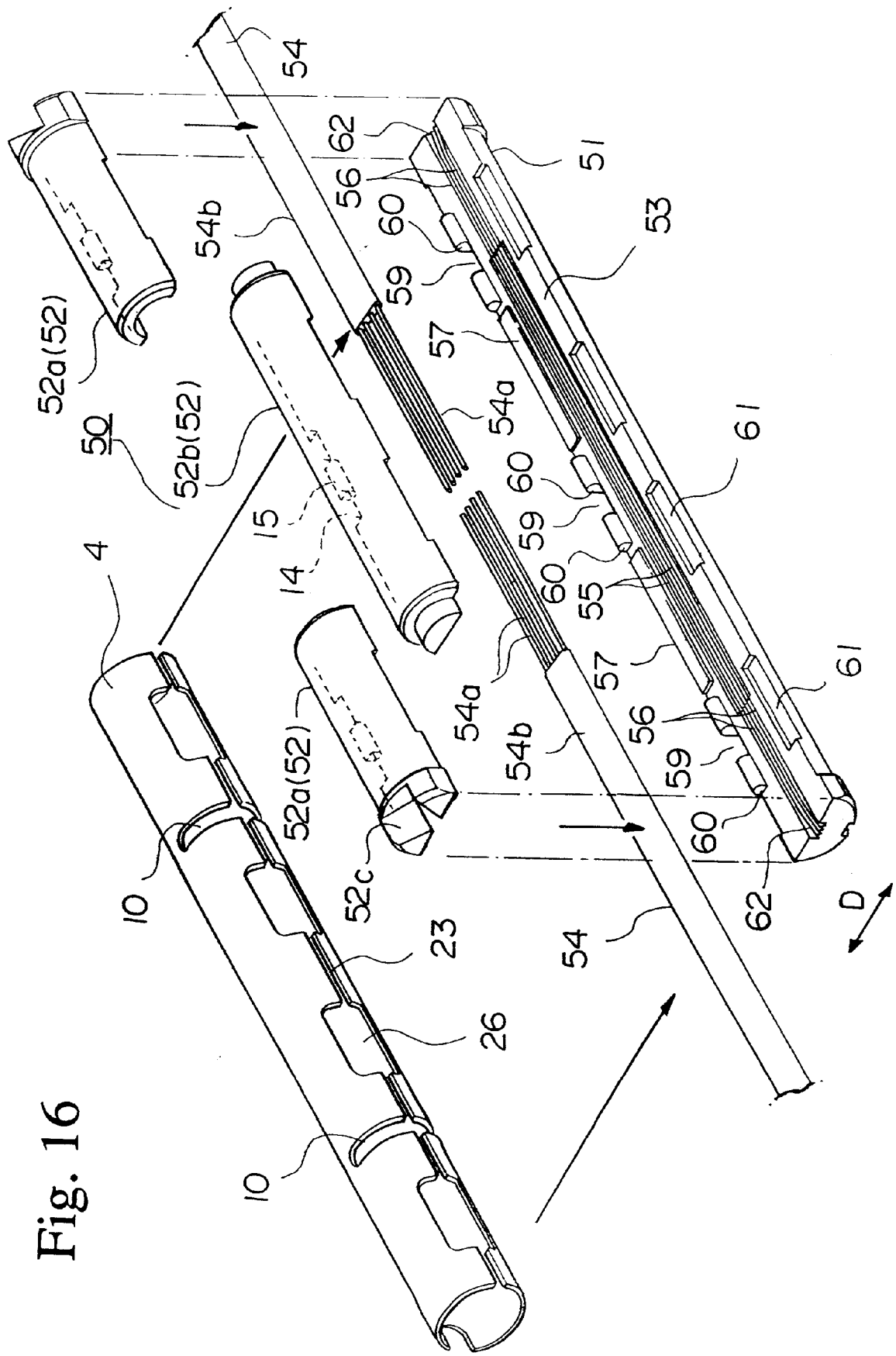
FIG. 16 is an exploded perspective view showing a second embodiment of the optical fiber connector of the present invention.

As shown in FIG. 16, the element 50 has a rod shape which is split into two and has a circular cross section, and is composed of a base 51 and a lid member 52 which both have a semi-circular cross section.

Figure 17:
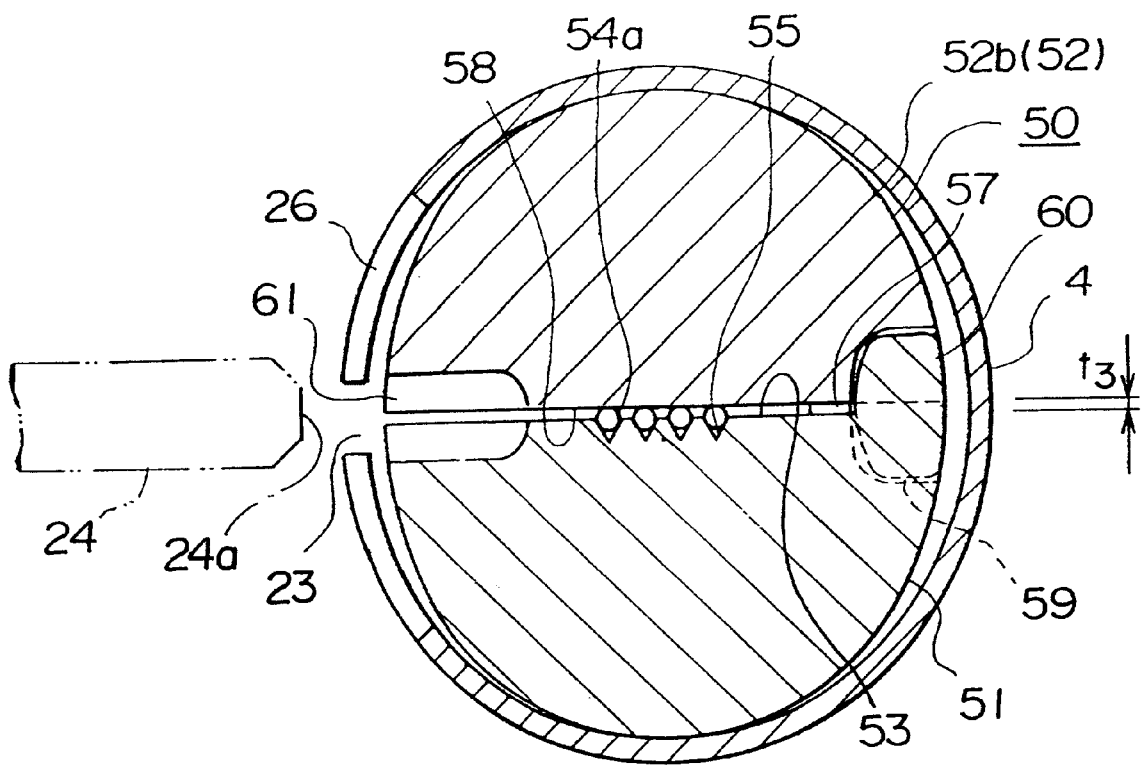
FIG. 17 is a section view in the vicinity of the centering grooves of the optical fiber connector in FIG. 16.

In the central portion in the longitudinal direction of the opposing face 53 opposing the lid member 52 of the base 51, a plurality of centering grooves 55 (V grooves) for positioning and centering a plurality of naked fibers 54 exposed from the ends of optical fiber tape cores (hereinafter referred to as "tape cores") 54 so as to be capable of being adjoined into connection are formed in parallel fashion, and optical fiber guide grooves 56 for guiding the naked fibers 54a to the centering grooves 53 from the outside of the element 50 are formed the ends of each centering groove 55 to the end portions in the longitudinal direction of the base 51. As shown in FIG. 17, when the centering grooves 55 house the naked fibers 54a, the naked fibers 54a protrude $t_3=25$ μm from the opposing face 53.

As with the engaging recesses 14 and engaging projections 15 of the first embodiment, engaging recesses 59 and engaging projections 60 which form a hinge mechanism for the base 51 and the lid member 52 are formed on the external side of one portion of the base 51 and the lid member 52 in the width direction of the opposing faces 53, 58 (the direction of the arrow D in FIG. 16), and wedge insertion grooves 61 are formed in the other side portion in the width direction. At a position on the external side of one side portion of the opposing face 53 of the base 51 which avoids the engaging recesses 59 and the engaging projections 60, a separation distance maintaining portion 57 protrudes so as to maintain the separation distance between the opposing faces 53, 58. The separation distance maintaining portion 57 is a portion of the base 51 which bulges outward so as to extend as a protruding strip parallel to the centering grooves 55, and protrudes from the opposing face 53 by approximately 25 μm.

As the separation distance maintaining portion, it is also possible to use other parts which are placed between the base 51 and lid member 52, such as projections which protrude from only the lid member 52 or projections which protrude from both the base 51 and the lid member 52, as long as they are capable of forming a desired gap $t_3$ (see FIG. 17) between the opposing faces 53, 58.

Figure 18:
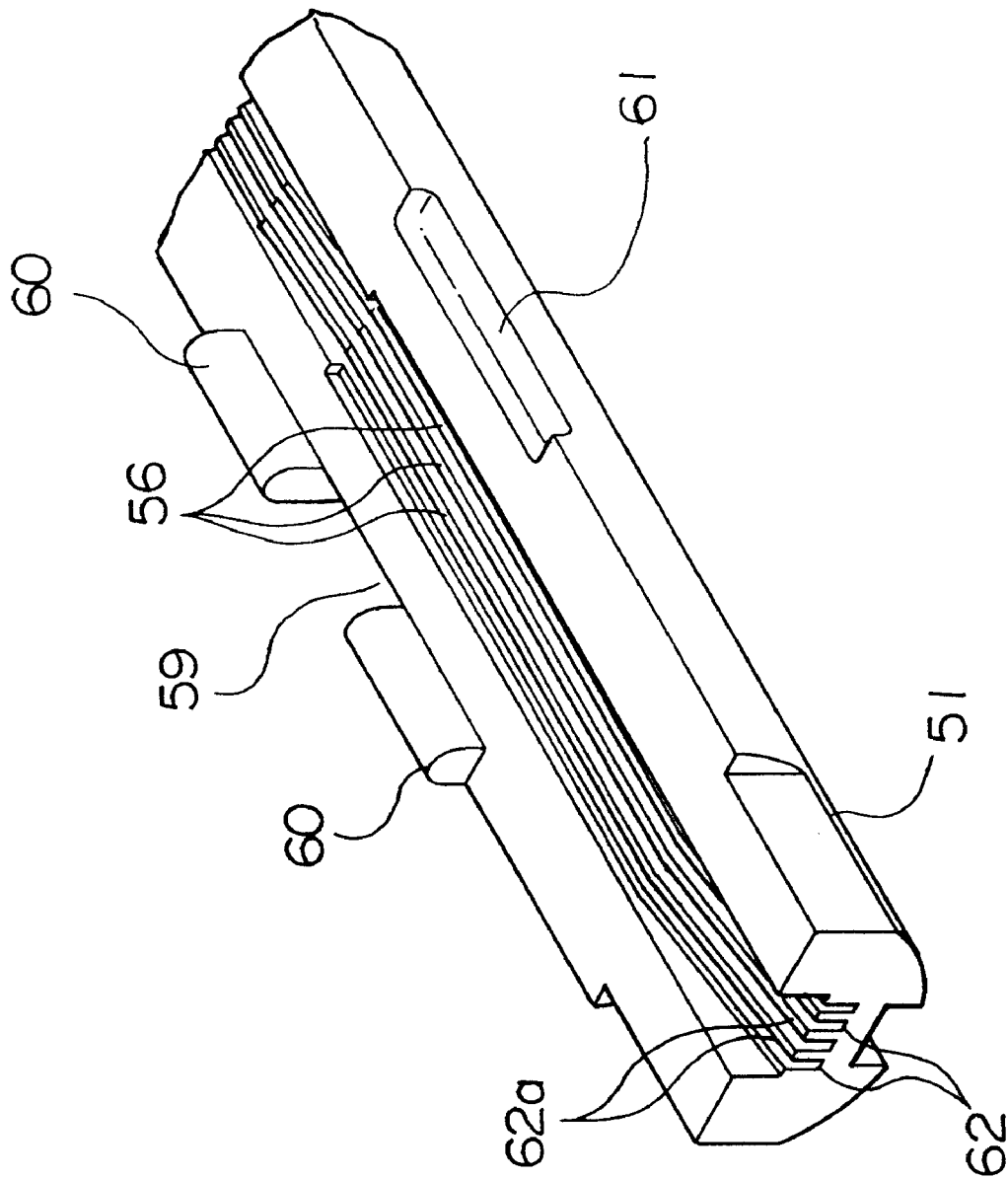
FIG. 18 is a partially enlarged perspective view showing end portions of the optical fiber guide grooves.

As shown in FIG. 18, the guide end portions 62 which open at both ends in the longitudinal direction of the base 51 of the optical fiber guide grooves 56 are inclined such that the depth from the opposing face 53 increases in approaching the tip of the base 51, so that the tape core 54 can be easily inserted even when the element 50 is united.

The lid member 52 is a three-part body composed of two end lids 52a and one central lid 52b which correspond to the division slits 10 of the C-shaped spring 4, so that the clamping force of each part of the C-shaped spring 4 divided by the division slits 10 separately acts on each part of the element 50 corresponding to the end lids 52a and central lid 52b.

Figure 19:
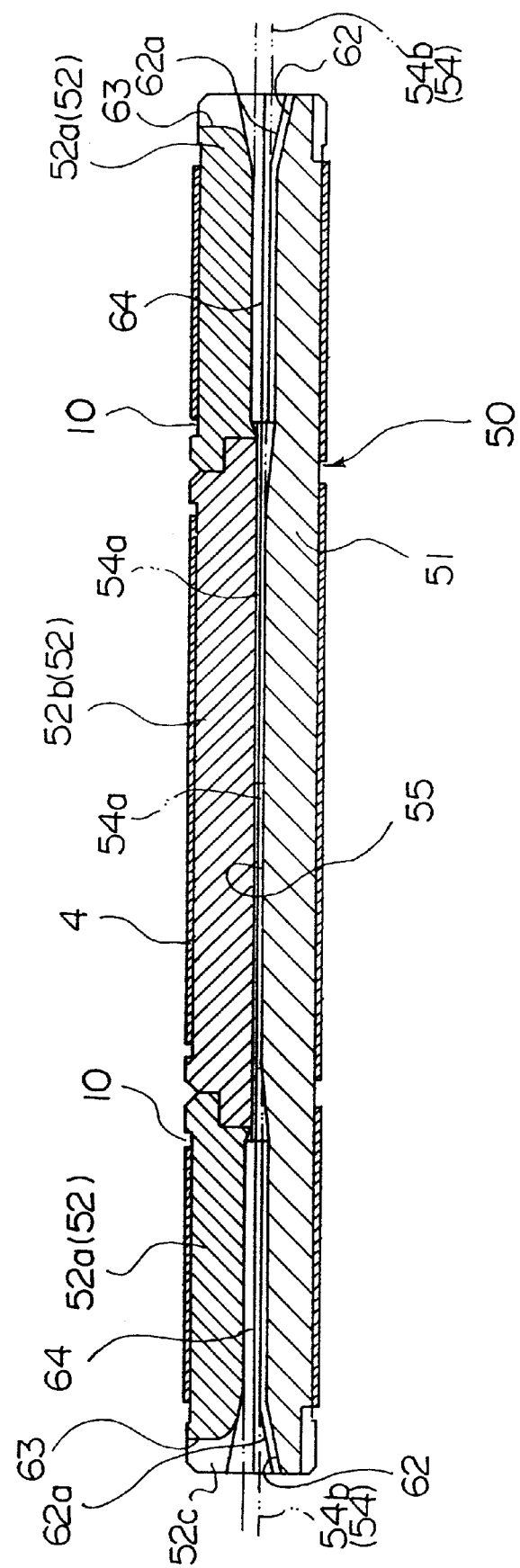
FIG. 19 is a section view showing the guiding concave portion in FIG. 18.
Figure 20:
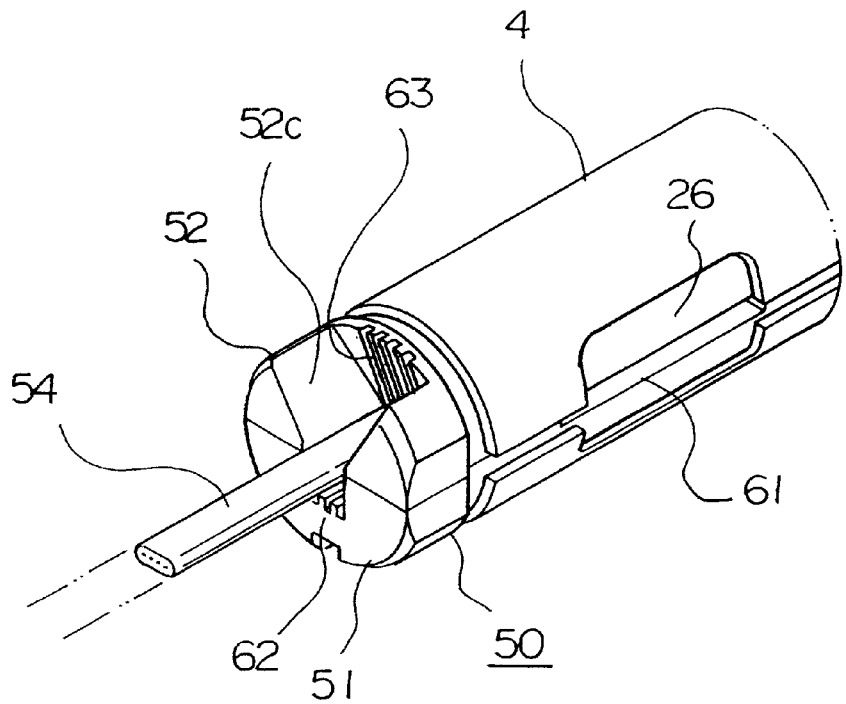
FIG. 20 is a partially enlarged perspective view showing the details of the guiding concave portion.
Figure 21:
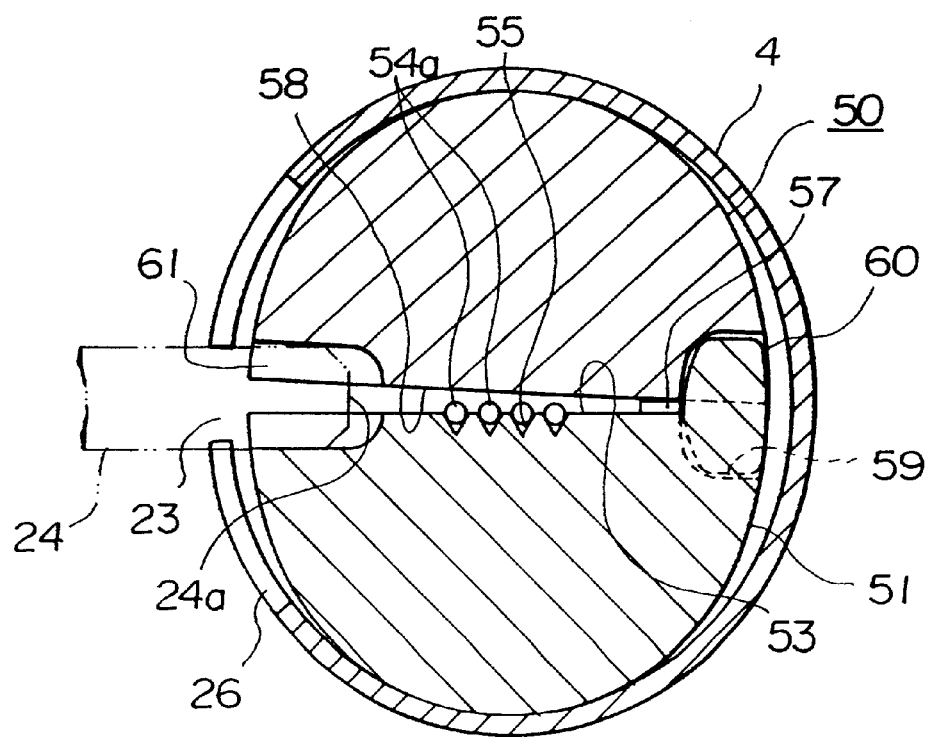
FIG. 21 is a section view of the vicinity of the centering grooves showing the state in which the clamping force on the optical fiber core is released by inserting a wedge into the elements of the optical fiber connector of FIG. 16.

As shown in FIGS. 16 and 19, guide recesses 52c for guiding the respective naked fibers 54a of the tape core 54 into the optical fiber guide grooves 56 are formed in both ends of the lid member 52 (the end of each end lid 52a). These guide recesses 52c are cut away such as to expose the guide end portions 62 of the optical fiber guide groove 56, and are tapered such that the opening gradually shrinks in approaching the centering groove 55. Moreover, as shown in FIG. 20, since a plurality of guide grooves 63 for guiding the tips of the naked fibers 54a from the guide recesses 52c to the respectively desired optical fiber guide grooves 56 are formed in the end surfaces of the end lids 52a, the naked fibers 54a can be easily inserted into the optical fiber guide grooves 56 simply by aligning the naked fibers 54a with the guide grooves 63 and pushing them into the element 1A.

As shown in FIG. 19, covered portion housing portions 64 for housing the covered 54b portions of the tape core 54 are formed between the end lids 52a and the base 51. The covered portion housing portions 64 are grooves which are recessed from the opposing faces 53, 58 of the base 51 and the end portions 52a, such that when the element 50 is closed, the covered 54b portions are clamped at the base 51 side on the same line as the centering axes of the naked fibers 54a in the centering grooves 55. The tape core 54 housed inside the covered portion housing portions 64 are clamped between the tips of partitioning walls 62a which partition the optical fiber guide grooves 56 (see FIG. 18) and the opposing face 58 of the end lids 52a. Each optical fiber guide groove 56 is inclined so as to run up from the covered portion housing portion 64 and communicate with a centering groove 55, so that the insertion of the naked fibers 54a from the optical fiber guide grooves 56 to the centering grooves 55 can be performed smoothly.

The tape cores 54 used in the optical fiber connector of the present embodiment, when adjoined into connection inside the optical fiber connector, are inserted into the centering groves 56 by exposing the naked fibers 54a at the tip portions to the lengths of housing of the centering grooves 55, then inserting them into the guide end portions 62 such that the naked fibers 54a are lain in the corresponding optical fiber guide grooves 56. When the naked fibers 54a are inserted into the centering grooves for a standard length, the covered 54b portions of the tape cores 54 run up from the optical fiber guide grooves 56 over the partitioning walls 62a and are housed in the covered portion housing portions 64. They can be clamped between the base 51 and the end lids 52a by applying the clamping force of the element 50 in this state.

While the optical fiber guide grooves 56 are square grooves in FIG. 18, they may be formed as V grooves or U grooves as well.

Hereinbelow, the operations and effects of the optical fiber connector according to the present embodiment shall be explained.

In order to adjoin tape cores 54 by using this optical fiber connector, the clamping force acting between the base 51 and the lid member 52 is relaxed by inserting wedges 24 into the wedge insertion grooves 61 (see FIG. 21) and inserting the naked fibers 54a exposed at the tips of the tape cores 54 from the guide end portions 62 at both ends of the element 50 so as to adjoin them inside the centering groove 55, then the wedges 24 are withdrawn to allow the clamping force of the C-shaped spring 4 to act on the element 50 to clamp the tape cores 54 between the base 51 and the lid member 52, thereby maintaining a state of adjoinment between the naked fibers 54a.

As shown in FIG. 17, when the tape cores 54 are clamped, a uniform gap of $t_3$ (=25 μm) is maintained between the opposing faces 53, 58 of the base 51 and the central lid 52 by the naked fibers 54a and the separation distance maintaining portions 57, so that the clamping force acts uniformly on each naked fiber 54a and all of the naked fibers 54a are centered with high precision, thereby increasing the connection precision between the tape cores 54. Additionally, when the wedges 24 are withdrawn from the wedge insertion grooves 61, the separation distance maintaining portions 57 first contact the opposing face 58 of the central lid 52b, thereby preventing the clamping force from being concentrated on the naked fibers 54a which are closest to the center of rotation of the base 51 and the lid member 52 and allowing the clamping force to act on all of the naked fibers 54a approximately simultaneously. As a result, the light transmission characteristics of all of the naked fibers 54a can be held stable.

The optical fiber connector of the present embodiment can also be applied to the connection of a plurality of single-core optical fibers.

The number of centering grooves 55 formed is not restricted to that shown, so that they can be made more numerous in order to enable application to the connection of optical fibers having more cores.

With the optical fiber connector of the present invention, it is possible to use centering grooves other than V grooves, e.g. U grooves, and it is possible to use clamping means other than C-shaped springs, e.g. square springs.

Additionally, as the centering mechanism, it is possible to use structures which hold the optical fibers at the center of three precision rods or three precision balls.

We claim:

1. An optical fiber connector for adjoining and connecting optical fibers, comprising:
   a base and a lid member which form an element having a doubly split structure when united;
   a spring for housing the base and the lid member and applying pressure to press them together; and
   a centering mechanism for provided on at least one of or between opposing faces of the base and the lid member for positioning and centering the optical fibers to be connected;
   wherein at least one wedge insertion groove is formed in the element so that by pressing a wedge into the at least one wedge insertion groove the spring is expanded to enable the separation of the base and the lid member.

2. The optical fiber connector as recited in claim 1, wherein the spring is a tubular C-shaped spring having a C-shaped cross-section, and the element is inserted inside the tubular C-shaped spring.

3. The optical fiber connector as recited in claim 2, wherein a tool engaging face for engaging a tool to restrict axial rotation of said element is formed on a side face of the element exposed in a state of protrusion from an end portion in the longitudinal direction of the C-shaped spring.

4. The optical fiber connector as recited in claim 2, wherein a rotation restricting projection and a rotation restricting recess are provided on the C-shaped spring and the element for mutually engaging so as to restrict relative axial rotation.

5. The optical fiber connector as recited in claim 1, wherein at least one engaging projection and at least one engaging recess are provided at the opposing faces of the base and the lid member for positioning them relative to each other, and wherein the at least one engaging projection and the at least one engaging recess are located at positions which oppose the at least one wedge insertion groove with respect to the centering axis of the centering mechanism.

6. The optical fiber connector as recited in claim 1, comprising a plurality of wedge insertion grooves formed at a plurality of locations on both sides in the longitudinal direction of the base and the lid member.

7. The optical fiber connector as recited in claim 1, wherein the element is composed of a transparent or translucent material.

8. The optical fiber connector as recited in claim 1, further comprising an opening piece having at least one wedge portion inserted into the at least one wedge insertion groove in a detachable manner so as to allow insertion of optical fibers into the element.

9. The optical fiber connector as recited in claim 1, wherein at least one pair of optical fiber guide grooves are formed on both ends of the base for guiding the optical fibers into the centering mechanism, and at least one pair of centering guide portions is formed between each of the at least one pair of optical fiber guide grooves and the centering mechanism, and the centering guide portions are formed into a tapered shape such that the centering position increases in approaching the centering mechanism.

10. The optical fiber connector as recited in claim 1, wherein the centering mechanism is a centering groove formed on one or both of the opposing faces of the base and the lid member, the centering groove being formed to a depth such that a housed optical fiber protrudes by at least 20 microns from the opposing face and a clearance is formed between the base and the lid member when an optical fiber housed in the centering groove is clamped.

11. The optical fiber connector as recited in claim 1, wherein the centering mechanism comprises a plurality of centering grooves formed on the opposing face on one or both of the base and the lid member, optical fiber guide grooves for guiding the optical fibers to the centering mechanism are provided on one or both of the base and the lid member, and covered portion housing portions for housing the covered portions of the optical fibers which are inserted into the centering grooves from the optical fiber guide grooves are provided between the base the lid member.

12. The optical fiber connector as recited in claim 1, wherein the centering mechanism is a centering groove formed by a V groove or a U groove, or a microcapillary.

13. The optical fiber connector as recited in claim 1, wherein at least one pair of optical fiber guide grooves are formed on both ends of the base for guiding the optical fibers into the centering mechanism, and at least one pair of guide recesses are formed in both ends of the lid member for exposing each optical fiber guide groove, so as to allow the optical fibers to be inserted from said guide recesses through the optical fiber grooves and into the centering mechanism.

14. An optical fiber connector for adjoining and connecting optical fibers, comprising:
   a base and a lid member which form an element having a doubly split structure when united;
   a spring for housing the base and the lid member and applying pressure to press them together; and
   a centering mechanism provided on at least one of or between opposing faces of the base and the lid member for positioning and centering the optical fibers to be connected;
   wherein the lid member comprises a central lid positioned in correspondence to the centering mechanism, and a pair of end lids positioned at both sides of the central lid in the centering axis direction of the centering mechanism.

15. The optical fiber connector as recited in claim 14, wherein the spring is a tubular C-shaped spring having a C-shaped cross section, the C-shaped spring is divided by division slits formed at a plurality of locations along the longitudinal direction of the element, into a center part and a pair of end parts which respectively apply pressure to the center lid and the end lids.

16. An optical fiber connector for adjoining and connecting optical fibers, comprising:
   a base and a lid member which form an element having a doubly split structure when united;
   a spring for housing the base and the lid member and applying pressure to press them together; and
   a centering mechanism provided on at least one of or between opposing faces of the base and the lid member for positioning and centering the optical fibers to be connected;
   wherein the centering mechanism comprises at least one centering groove formed by a V groove or a U groove, and the centering groove is formed in a centering chip incorporated near an opposing surface on one or both of the base and the lid member.

17. An optical fiber connector for adjoining and connecting optical fibers, comprising:

a base and a lid member which form an element having a doubly split structure when united;

a spring for housing the base and the lid member and applying pressure to press them together; and a centering mechanism provided on at least one of or between opposing faces of the base and the lid member for positioning and centering the optical fibers to be connected;

wherein the centering mechanism comprises a plurality of centering grooves formed on the opposing face on one or both of the base and the lid member, a separation distance maintaining portion which protrudes from at least one opposing face is provided between both of the opposing faces of the base and the lid member when the optical fibers housed in the centering grooves are clamped is held uniform by the optical fibers and the separation distance maintaining portion.

18. An optical fiber connector for adjoining and connecting optical fibers, comprising:

an element which can be opened and closed for pinching optical fibers;

a spring for clamping the element so as to pinch the optical fibers with the element; and a centering mechanism provided in the element for positioning and centering the optical fibers pinched by the element;

wherein at least one wedge insertion groove is formed in the element so that by pressing a wedge into the at least one wedge insertion groove the spring is expanded to enable the opening of the element.

* * * * *